(12) United States Patent
Ansari

(10) Patent No.: US 12,376,594 B2
(45) Date of Patent: Aug. 5, 2025

(54) PEST CONTROL KIT AND METHOD

(71) Applicant: Syngenta Crop Protection AG, Basel (CH)

(72) Inventor: Minshad Ali Ansari, Swansea (GB)

(73) Assignee: SYNGENTA CROP PROTECTION AG, Basel (CH)

(*) Notice: Subject to any disclaimer, the term of this patent is extended or adjusted under 35 U.S.C. 154(b) by 869 days.

(21) Appl. No.: 17/598,317

(22) PCT Filed: Mar. 24, 2020

(86) PCT No.: PCT/GB2020/050785
§ 371 (c)(1),
(2) Date: Sep. 27, 2021

(87) PCT Pub. No.: WO2020/193969
PCT Pub. Date: Oct. 1, 2020

(65) Prior Publication Data
US 2022/0159966 A1    May 26, 2022

(30) Foreign Application Priority Data
Mar. 25, 2019 (GB) .................................... 1904086

(51) Int. Cl.
*A01N 63/12* (2020.01)
*A01N 25/30* (2006.01)
*A01P 7/04* (2006.01)

(52) U.S. Cl.
CPC ............ *A01N 63/12* (2020.01); *A01N 25/30* (2013.01); *A01P 7/04* (2021.08)

(58) Field of Classification Search
CPC ........ A01N 63/12; A01N 25/30; A01N 63/00; A01P 7/04
See application file for complete search history.

(56) References Cited

U.S. PATENT DOCUMENTS 6,637,366 B1 * 10/2003 Bedding .............. A01K 67/033
119/6.7
2005/0288389 A1 * 12/2005 Kostka ................... C09K 17/18
523/132
(Continued)

FOREIGN PATENT DOCUMENTS

CN    105123766    12/2015
CN    106561718    4/2017
(Continued)

OTHER PUBLICATIONS

"CN 106561718 A, Machine translation, Apr. 19, 2017" (Year: 2017).*
(Continued)

*Primary Examiner* — Benjamin J Packard
(74) *Attorney, Agent, or Firm* — BakerHostetler; Toni-Junell Herbert

(57) ABSTRACT

A pest control kit is provided to aid the control of a population of immature larval stages or pupal insects. The pest control kit comprises an amount of an entomopathogenic nematode and a wetting agent composition, the wetting agent composition comprising: a solvent; and a surfactant. The pest control kit aims to provide a naturally occurring entomopathogenic nematode for biological control of immature larval insects which can act as pests to plants, whether these be for professional plant protection including agricultural, forestry and horticultural or for home garden use. The new pest control product of the present invention aims to prove safe and sustainable protection for turf and plants all year round.

27 Claims, 12 Drawing Sheets

(56) References Cited

U.S. PATENT DOCUMENTS

| | | | |
|---|---|---|---|
| 2011/0197289 A1 | 8/2011 | Fayyaz et al. | |
| 2014/0148510 A1* | 5/2014 | Pirotte | A01N 25/02 514/529 |

FOREIGN PATENT DOCUMENTS

| | | | | |
|---|---|---|---|---|
| CN | 106561718 A | * | 4/2017 | |
| JP | 2001328916 | | 11/2001 | |
| JP | 2015-54880 A | | 3/2015 | |
| WO | WO 2009/050482 | | 4/2009 | |
| WO | WO-2014053404 A1 | * | 4/2014 | A01N 43/22 |
| WO | WO-2014086753 A2 | * | 6/2014 | A01N 63/30 |
| WO | WO 2016/001125 | | 1/2016 | |
| WO | 2018079565 A1 | | 5/2018 | |

OTHER PUBLICATIONS

Hoctor, Terri L et al. "Survival and Infectivity of the Insect-Parasitic Nematode Heterorhabditis bacteriophora Poinar in Solutions Containing Four Different Turfgrass Soil Surfactants." Insects vol. 4, 1 1-8. Dec. 20, 2012, doi: 10.3390/insects4010001 (Year: 2012).*
Nemaslug, Super. "Nemaslug Large Instructions." Nemaslug Large Instructions, May 25, 2016, web.archive.org/web/20160525175504/nemaslug.co.uk/nemasys-instructions/16-nemaslug-large-instructions. (Year: 2016).*
McGraw, Benjamin A., and Maxim J. Schlossberg. "Fine-scale spatial analysis of soil moisture and entomopathogenic nematode distribution following release in wetting agent-treated turf." Applied Soil Ecology 114 (2017): 52-61. (Year: 2017).*
Patents Act 1977: Search Report under Section 17(5) Dated Sep. 5, 2019 From the Intellectual Property Office of the United Kingdom of Great Britain Re. Application No. 1904086.4. (4 Pages).
International Search Report and the Written Opinion Dated May 29, 2020 From the International Searching Authority Re. Application No. PCT/G82020/050785. (40 Pages).
Hoctor et al., "Survival and Infectivity of the Insect-Parasitic Nematode Heterorhubditis bacteriophora Poinar in Solutions Containing Four Different Turfgrass Soil Surfactants", Insects 4(1):1-8, XP055696587, Dec. 20, 2012.
McGraw et al., "Fine-Scale Spatial Analysis of Soil Moisture and Entomopathogenic Nematode Distribution Following Release in Wetting Agent-Treated Turf", Applied Soil Ecology, 114:52-61, XP055696590, Jun. 2017.
Shapiro-Ilan et al., "Entomopathogenic Nematode Production and Application Technology", Journal of Nematology, 44(2):206-217, 2012.
Williams et al., "Foliar Application of the Entomopathogenic Nematode Steinernema feltiae Against Leafminers on Vegetables", Biocontrol Science and Technology, 10:61-70, Published Online Jun. 28, 2010.

* cited by examiner

Figure 1:
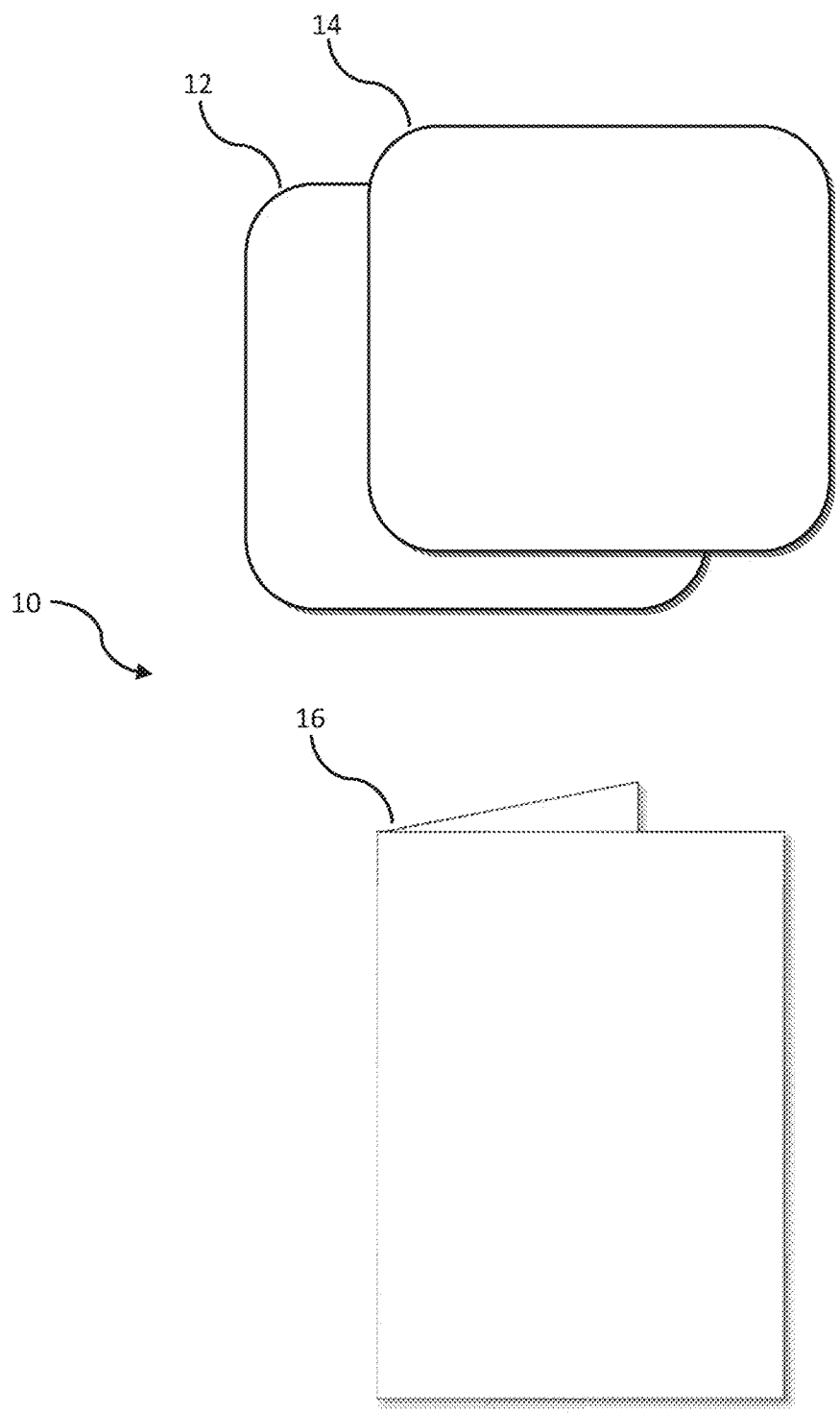

20 a) providing a pest control kit according to FIG. 1

22 b) mixing the amount of entomopathogenic nematode and the soil conditioning composition with a volume of water to generate a volume of activated biopesticide

24 c) applying the volume of activated biopesticide to an area of earth

26

FIG. 12

PEST CONTROL KIT AND METHOD

RELATED APPLICATIONS

This application is a National Phase of PCT Patent Application No. PCT/GB2020/050785 having International filing date of Mar. 24, 2020, which claims the benefit of priority of United Kingdom Patent Application No. 1904086.4 filed on Mar. 25, 2019. The contents of the above applications are all incorporated by reference as if fully set forth herein in their entirety.

FIELD AND BACKGROUND OF THE INVENTION

The present invention relates to biopesticides, particularly to bioinsecticides (biological control agents) for use in professional plant protection, horticultural, forestry and agricultural applications or home garden.

In general, a pesticide is a chemical or biological agent that deters, incapacitates, kills, or otherwise discourages pests. Target pests can include insects, plant pathogens, weeds, molluscs, birds, mammals, fish and microbes that destroy property, cause nuisance, or spread disease, or are disease vectors. Although pesticides have benefits, many also have drawbacks, such as potential toxicity to humans and other species, along with adverse effects on the environment.

Chemical pesticides may cause acute and delayed health effects in people who are exposed. Chemical pesticide exposure can cause a variety of adverse health effects, ranging from simple irritation of the skin and eyes to more severe effects such as affecting the nervous system, mimicking hormones causing reproductive problems, and also causing cancer.

Chemical pesticide use raises a number of environmental concerns. Research suggests that over 98% of sprayed insecticides and 95% of herbicides reach a destination other than their target species, including non-target species, air, water and soil.

Biopesticides are a natural alternative to toxic chemical pesticides—plants, bacteria, fungi and minerals for the control of insect pests which attack food and other crops of all kinds. Biopesticides are comparatively safe, and are generally non-toxic to users and consumers, decompose rapidly and can be targeted at specific pests to avoid harming beneficial insects.

In spite of research in the field of biopesticides, there remains to be an effective, multipurpose solution with a wide variety of applications, that is both user-friendly and can be tailored to a particular application. As a result, uptake of biopesticides is relatively low compared to chemical pesticides, in spite of the many advantages of biopesticides.

It is therefore desirable to provide an easier alternative to chemical pesticides that is flexible for multiple applications and is user-friendly to aid adoption.

SUMMARY OF THE INVENTION

In accordance with a first aspect of the present invention, there is provided a pest control kit, the pest control kit comprising: (a) an amount of an entomopathogenic nematode; and (b) a wetting composition, the wetting composition comprising one or more surfactants.

Preferably the amount of entomopathogenic nematode is predetermined. The term "amount" will be understood by the skilled addressee to mean "quantity of organisms". It will be understood that the kit may comprise an admixture of one or more nematode strains, each having a respective amount. The amounts of the one or more nematode strains may be the same or different according to the desired application of the kit.

The wetting agent composition, of the present invention is preferably key to the functioning of the invention. Key factors improved in the present wetting agent, over known wetting agents, preferably include improved compatibility with entomopathogenic nematode strains (including improved nematode viability), improved wetting capacity, and improved efficacy of entomopathogenic nematode strains.

In particular, using a pest control kit of the invention typically at least 90% of the entomopathogenic nematodes survive for at least 24 hours after administration of the pest control kit; and/or pest mortality is typically at least 90% for at least 24 hours, preferably at least 48 hours, even more preferably at least 72 hours after administration of the pest control kit; and/or dispersal of the entomopathogenic nematodes is typically increased compared with control entomopathogenic nematodes in the absence of the wetting agent composition.

Preferably the wetting agent composition further comprises a solvent. Preferably the solvent comprises a glycol ether. Preferably the glycol ether is dipropylene glycol methyl ether. Preferably the solvent is present in a solvent concentration selected from between 1% to 25% of the unmixed wetting agent composition. Most preferably the solvent is dipropylene glycol methyl ether present in a solvent concentration of between 5% and 10% of the unmixed wetting agent composition. In a most preferable embodiment, the concentration of dipropylene glycol methyl ether is between 50 and 100 mL in 1 litre.

Preferably the one or more surfactants comprises a surfactant selected from the group of polyoxyalkylene glycol surfactants. An example may comprise polyethylene glycol. The one or more surfactants may comprise a non-ionic surfactant. Other embodiments may comprise one or more surfactants selected from anionic surfactants. In embodiments, the one or more surfactants may comprise a phosphate ester salt. Preferably the phosphate ester salt is a potassium salt. Preferably the surfactant is an aryl ether phosphate ester potassium salt. Preferably the surfactant is present in a surfactant concentration selected from between 0.5% and 10% of the unmixed wetting agent composition. Most preferably the surfactant is an aryl ether phosphate ester potassium salt present in a surfactant concentration selected from between 1% and 3% of the unmixed wetting agent composition. In a most preferable embodiment, the concentration of the aryl ether phosphate ester potassium salt is selected from between 10 mL and 30 mL in 1 litre. Preferably the wetting agent composition comprises one or more reverse block copolymer surfactants.

Any surfactant of the invention may be combined with any solvent of the invention in a pest control kit, with any concentration of either solvent and/or surfactant as disclosed herein. Particularly preferred is a wetting agent composition comprising a glycol ether solvent (e.g. dipropylene glycol methyl ether) and a polyoxyalkylene glycol surfactant (e.g. polyethylene glycol), wherein the surfactant may be present as a phosphate ester salt (particularly a potassium salt, e.g. an aryl ether phosphate ester potassium salt).

Research has found that alcohol ethoxylates (common surfactants in current soil conditioner compositions) are desiccating in nature and the potential increased bioavailability of these chemicals versus phosphate ester salts may enhance the desiccating property, thereby immobilizing nematodes. For example, *Steinernema carpocapsae* has been shown to enter anhydrobiosis when threatened with desiccation. Research has found that such common coil conditioners can have an immobilizing effect on nematodes and can even be nematocidal. It is therefore important that wetting agents and/or soil conditioners should always be checked before they are combined with a nematode species as they can be responsible for killing the nematodes within 3-6 hours—thus eliminating the efficacy of said nematodes.

Many wetting agents intend to break down the interface of water and oils and allow the removal of oils. The least compatible wetting agents tend to include block copolymers, which tend to be water soluble. The present wetting agent preferably comprises reverse block copolymers which are oil soluble. Preferably wetting agents having reverse triblock copolymers exhibit improved nematode viability.

The wetting agent composition preferably further comprises one or more wetting compounds. Preferably the one or more wetting compounds are selected from alkylene oxides. Preferably the one or more wetting compounds comprise a compound selected from polyhydroxyethyl alkaxy alkylene oxides.

The wetting agent composition preferably further comprises a soil penetrant. The one or more soil penetrants preferably also aid in nematode movement.

Preferably the wetting agent composition is provided in liquid or powdered form. Preferably the powder is anhydrous.

Preferably the liquid or powdered wetting agent composition is arranged to be mixed with water to provide a working wetting agent having a mixed concentration selected from between 2.22% v/v and 2.86% v/v (calculated based on a field application of 20 L of the wetting agent composition in 700-900 L of water for 1 hectare). Preferably the working wetting agent is arranged to be mixed with water at a mixing ratio of working wetting agent:water to provide a final wetting agent composition, wherein the mixing ratio is selected from between 1:2.22 and 1:2.86. Most preferably the mixing ratio is selected from between 1:35 and 1:90. Most preferably the mixing ratio is selected from between 1:70 and 1:90.

The wetting agent composition described preferably improves efficacy of a containing entomopathogenic nematode strain. The wetting agent composition also preferably reduces water repellence within a soil to which it is applied in a final wetting agent composition, preferably providing sufficient moisture retention near the root-zone of plants, crops and other horticultural entities, where nematodes can locate the target and survive longer than those accompanied by other known wetting agent compositions. This is especially important since nematodes typically require a film of water/liquid to move. If water/liquid is unavailable due to the desiccating nature of many other wetting agents, then the life of a nematode can be compromised.

Preferably the pest control kit further comprises a training package, the training package being arranged to train users to use the (appropriate) amount of entomopathogenic nematode and the wetting agent composition to control a population of larval insects.

Preferably the amount of entomopathogenic nematode comprises between 0.5 and 5.0 billion infective nematodes (typically infective juvenile (IJ) nematodes). Across an area of land, the amount of entomopathogenic nematode preferably comprises between 2.5 and 5.0 billion infective nematodes per hectare. The amount of infective nematodes preferably depends on the pest situation, density and the area of application.

Preferably the entomopathogenic nematode is selected from the *Heterorhabditis* genera and/or the *Steinernema* genera. Preferably the entomopathogenic nematode is selected from the group: *Heterorhabditis bacteriophora, Heterorhabditis downesi, Steinernema feltiae, Steinernema carpocapsae*, and/or *Steinernema kraussei.*

Preferably the pest control kit is used to control a population of larval, pupal and/or adult insects. More preferably, the insects are selected from the group: *Tipula* spp., *Tipula oleracea, Gryllotalpa Gryllotalpa, Agrotis* spp., *Otiorhynchus sulcatus, Otiorhynchus* spp., *Hoplia philanthus, Phyllopertha horticola, Amphimallon solstitialis, Melolontha melolontha, Serica brunnea, Cydia pomonella, Cydia molesta, Cydia splendana, Ephydridae, Spodoptera* spp., *Chrysodeixis chalcites, Mamestra brassicae* and *Duponchelia fovealis, Hylobius abietis, Frankliniella occidentalis, Chromatomyia syngenesiae, Phytomyza vitalbaek Anoplophora chinensisk lps typographus, Synanthedon myopaeformis, Opogona sacchari, Diaprepes abbreviates, Grapholita molesta, Grapholita funebrana, Chrysoteuchia topiaria, Rhabdopterus picipes, Capnodis tenebrionis, Curculio nucum, Zeuzera pyrina, Thaumetopoea processionea, Paysandisia archon, Synanthedon exitiosa, Rhynchophorus ferrugineus, Diabrotica virgifera, Bibionidae*, and/or *Porcellio scaber.*

Preferably the entomopathogenic nematodes are active at temperatures above 12° C. More preferably the entomopathogenic nematodes are active at temperatures above 10° C. More preferably the entomopathogenic nematodes are active at temperatures above 8° C.

Preferably the entomopathogenic nematode has a kill rate that is between 70% and 100%. More preferably, the kill rate is between 80% and 100%. Most preferably the kill rate is between 90% and 100%.

Preferably the pest control kit is used to control a population of larval and/or pupal insects selected from the group: *Tipula* spp., *Tipula oleracea, Gryllotalpa Gryllotalpa*, and/or *Agrotis* spp. Preferably, in such embodiments, the entomopathogenic nematode comprises *Steinernema carpocapsae* and/or *Steinernema feltiae*. More preferably, in such embodiments, the amount of entomopathogenic nematode is active above 8° C. or 12° C. Most preferably, in such embodiments, the kill rate is between 70% and 100%. Preferably, in such embodiments, the training package is arranged to train users to use the (appropriate) amount of entomopathogenic nematode and the wetting agent composition to control a population of larval insects in turf, sport and amenity applications. Turf, sport and amenity applications in the context of the present invention refers to use on golf greens, soccer pitches, rugby grounds and all sports and amenity turf.

Preferably, the pest control kit is used to control a population of larval and/or pupal insects selected from the group: *Hoplia philanthus, Phyllopertha horticola, Amphimallon solstitialis, Melolontha melolontha*, and/or *Serica brunnea*. Preferably, in such embodiments, the entomopathogenic nematode comprises *Heterorhabditis bacteriophora* or combination of *Heterorhabditis bacteriophora* and *Steinernema feltiae*. More preferably, in such embodiments, the amount of entomopathogenic nematode is active above 8° C. or 12° C. Most preferably, in such embodiments, the kill rate is between 80% and 100%. Preferably, in such embodiments, the training package is arranged to train users to use the (appropriate) amount of entomopathogenic nematode and the wetting agent composition to control a population of larval insects in turf, sport and amenity applications. Turf, sport and amenity applications in the context of the present invention refers to use on golf greens, soccer pitches, rugby grounds and all sports and amenity turf.

Preferably the pest control kit is used to control a population of larval and/or pupal insects selected from the group: *Frankliniella occidentalis, Chromatomyia syngenesiae, Phytomyza vitalbae, Liriomyza* spp., *Tuta absoluta, Crioceris* spp., *Synanthedon myopaeformis, Cydia pomonella, Grapholita molesta, Grapholita funebrana, Thaumetopoea processionea, Tipula oleracea,* and/or *Bibionidae*. Preferably, in such embodiments, the entomopathogenic nematode comprises *Steinernema feltiae*. More preferably, in such embodiments, the amount of entomopathogenic nematode is active above 8° C. Most preferably, in such embodiments, the kill rate is between 80% and 100%. Preferably, in such embodiments, the training package is arranged to train users to use the (appropriate) amount of entomopathogenic nematode and the wetting agent composition to control a population of larval insects in horticulture applications. Horticulture applications in the context of the present invention refers to use on soft fruits, ornamentals and flowers.

Preferably the pest control kit is used to control a population of larval and/or pupal insects selected from the group: *Otiorhynchus sulcatus, Hoplia* spp., *Phyllopertha horticola, Amphimallon solstitialis,* and/or *Melolontha melolontha*. Preferably, in such embodiments, the entomopathogenic nematode comprises *Heterorhabditis bacteriophora* and/or *Steinernema feltiae*. More preferably, in such embodiments, the amount of entomopathogenic nematode is active above 8° C. Most preferably, in such embodiments, the kill rate is between 90% and 100%. Preferably, in such embodiments, the training package is arranged to train users to use the (appropriate) amount of entomopathogenic nematode and the wetting agent composition to control a population of larval insects in horticulture applications. Horticulture applications in the context of the present invention refers to use on soft fruits, ornamentals and flowers.

Preferably the pest control kit is used to control a population of larval and/or pupal insects selected from the group: *Otiorhynchus sulcatus, Hylobius abietis, Anoplophora chinensis, Ips typographus, Diaprepes abbreviates, Rhabdopterus picipes, Curculio nucum,* and/or *Diabrotica virgifera*. Preferably, in such embodiments, the entomopathogenic nematode comprises *Heterorhabditis downesi* and/or *Heterorhabditis bacteriophora*. More preferably, in such embodiments, the amount of entomopathogenic nematode is active above 8° C. or 12° C. Most preferably, in such embodiments, the kill rate is between 90% and 100%. Preferably, in such embodiments, the training package is arranged to train users to use the (appropriate) amount of entomopathogenic nematode and the wetting agent composition to control a population of larval insects in horticulture applications. Horticulture applications in the context of the present invention refers to use on soft fruits, ornamentals and flowers.

Preferably the pest control kit is used to control a population of larval and/or pupal insects selected from the group: *Cydia pomonella, Cydia molesta, Cydia splendana, Ephydridae, Spodoptera* spp. *Chrysodeixis chalcites, Mamestra brassicae, Duponchelia fovealis, Hylobius abietis, Anoplophora chinensis, Ips typographus, Opogona sacchari, Chrysoteuchia topiaria, Capnodis tenebrionis, Zeuzera pyrina, Paysandisia archon, Synanthedon exitiosa, Rhynchophorus ferrugineus, Agrotis* spp., and/or *Porcellio scaber*. Preferably, in such embodiments, the entomopathogenic nematode comprises *Steinernema carpocapsae*. More preferably, in such embodiments, the amount of entomopathogenic nematode is active above 14° C. Most preferably, in such embodiments, the kill rate is between 90% and 100%. Preferably, in such embodiments, the training package is arranged to train users to use the (appropriate) amount of entomopathogenic nematode and the wetting agent composition to control a population of larval insects in trees and forest applications. Trees and forest applications in the context of the present invention refers to use on regions comprising trees and forestry.

Preferably the pest control kit is used to control a population of larval and/or pupal insects selected from the group: *Lycoriella* spp., and/or *Bradysia* spp. Preferably, in such embodiments, the entomopathogenic nematode comprises *Steinernema feltiae*. More preferably, in such embodiments, the amount of entomopathogenic nematode is active above 8° C. Most preferably, in such embodiments, the kill rate is between 90% and 100%. Preferably, in such embodiments, the training package is arranged to train users to use the (appropriate) amount of entomopathogenic nematode and the wetting agent composition to control a population of larval insects in mushroom cultivation applications. Mushroom cultivation applications in the context of the present invention refers to use on regions used for mushroom cultivation.

In accordance with a second aspect of the present invention, there is provided a method of controlling a population of larval insects, the method comprising the steps of:
  a) providing a pest control kit according to the first aspect of the present invention;
  b) mixing the amount of entomopathogenic nematode and the wetting agent composition with a volume of water to generate a volume of activated biopesticide; and
  c) applying the volume of activated biopesticide to an area of earth or the foliar infested part of one or more plants.

In accordance with a third aspect of the present invention, there is provided a method of controlling a population of larval insects, the method comprising the steps of:
  a) providing an amount of entomopathogenic nematode;
  b) providing a wetting agent composition comprising one or more surfactants; and
  c) providing a training package, the training package comprising steps arranged to train users in providing the amount of entomopathogenic nematode and the wetting agent composition to control a population of larval insects.

Preferably the amount of entomopathogenic nematode and the wetting agent composition are as suitable for a pest control kit according to the first aspect of the present invention.

In accordance with a fourth aspect of the present invention, there is provided a pest control kit, the pest control kit comprising:
  a) an amount of entomopathogenic nematode;
  b) a wetting agent composition comprising: one or more surfactants; and
  c) a training package comprising the teaching of a method, the method comprising the steps of: using the amount of entomopathogenic nematode and the wetting agent composition to control a population of larval insects.

Preferably the amount of entomopathogenic nematode and the wetting agent composition are as suitable for a pest control kit according to the first aspect of the present invention.

Preferably the training package method is directed toward a particular application of the method. More preferably the application comprises one selected from the group: turf, sport and amenity applications; horticulture applications; trees and forest applications; mushroom cultivation applications. Turf, sport and amenity applications in the context of the present invention refers to use on golf greens, soccer pitches, rugby grounds and all sports and amenity turf. Horticulture applications in the context of the present invention refers to use on soft fruits, ornamentals and flowers. Trees and forest applications in the context of the present invention refers to use on regions comprising trees and forestry. Mushroom cultivation applications in the context of the present invention refers to use on regions used for mushroom cultivation.

DESCRIPTION OF SPECIFIC EMBODIMENTS OF THE INVENTION

Insect parasitic nematodes, also known as entomopathogenic nematodes, are soil-dwelling roundworms which have been commercialised for control of agricultural, horticultural and forestry pests or home and garden with some notable successes. However, the ability of these nematodes to efficiently locate and kill the target insect host can be severely affected by environmental conditions, with soil moisture being one of the most important factors influencing the survival, persistence and infectivity of nematodes in the field. Entomopathogenic nematodes utilise moisture in the soil to move and prevent them from desiccation but water repellency or hydrophobicity in soils has become a problem that can prevent nematode successful application.

Various commercial products such as soil surfactants, soil conditioners, wetting agents or soil penetrants have been used to improve the effects of soil water repellency to lower the interfacial tension between a hydrophilic and non-wettable hydrophobic stage. These wetting agents help improving water movement across the soil profile, increase water efficiency by ameliorating water repellency and improve homogenous distribution of water.

Therefore, the present invention details about the pest control kit comprising entomopathogenic nematodes plus a wetting agent composition, and preferably along with a training package to training users to control a population of target insect pest(s) damaging the commodity of interest.

Typically, the pest control kit of the invention does not comprise a chemical pesticide. Preferably, the pest control kit of the invention does not comprise a chemical pesticide and is not intended for use in combination with a chemical pesticide (whether the pest control kit of the invention and the chemical pesticide are applied simultaneously or sequentially). As shown in the Examples below, the present inventors have demonstrated that conventional wetting agents are not suited for use with entomopathogenic nematodes. In particular, conventional wetting agents have been shown to reduce the survival of entomopathogenic nematodes, and to reduce the pesticidal activity of entomopathogenic nematodes compared with wetting agents used in the pest control kits of the invention. Thus, the pest control kits of the present invention provide surprising advantages over the solutions known in the art.

Survival of entomopathogenic nematodes according to the invention may be at least comparable to the survival of a reference population of the same entomopathogenic nematode in the absence of a wetting agent of the invention. Survival of entomopathogenic nematodes according to the invention is typically improved compared to the survival of a reference population of the same entomopathogenic nematode in the presence of a conventional wetting agent. Typically, at least 90%, at least 91%, at least 92%, at least 93%, at least 94%, at least 95%, at least 96%, at least 97%, at least 98%, at least 99% or more of the entomopathogenic nematodes comprised in a pest control kit of present invention survive for at least 24 hours, at least 48 hours, at least 72 hours or more after administration of said pest control kit. The survival of the entomopathogenic nematodes may vary depending on the specific species (exemplary species are described herein). However, preferably for any given entomopathogenic nematode comprised in a pest control kit of the invention, at least 90% will survive for at least 24 hours after administration. Survival of the entomopathogenic nematodes may be determined using any appropriate methods, exemplary methods being standard in the art. By way of non-limiting example, survival of the entomopathogenic nematodes may be determined using a compatibility assay, such as the standard method described in Example 1 below.

The pesticidal activity of entomopathogenic nematodes according to the invention may be at least comparable to the pesticidal activity of a reference population of the same entomopathogenic nematode in the absence of a wetting agent of the invention. The pesticidal activity of entomopathogenic nematodes according to the invention is typically improved compared to the pesticidal activity of a reference population of the same entomopathogenic nematode in the presence of a conventional wetting agent. Pesticidal activity may be quantified in any appropriate way. By way of non-limiting example, pesticidal activity of entomopathogenic nematodes may be quantified in terms of the % of pests to be treated that have been killed at/by a given time point (referred to interchangeably herein as the pest mortality). Typically, the pest mortality of a pest to be treated is at least 90%, at least 91%, at least 92%, at least 93%, at least 94%, at least 95%, at least 96%, at least 97%, at least 98%, at least 99% or more for at least 24 hours, at least 48 hours, at least 72 hours or more after administration of said pest control kit. The pest mortality may vary depending on the specific pest species and/or the specific species of entomopathogenic nematodes (exemplary pest and entomopathogenic nematodes species are described herein). However, preferably for any given entomopathogenic nematode and pest, the pest mortality is at least 90% for at least 24 hours after administration, more preferably for at least 48 hours after administration, even more preferably for at least 72 hours after administration. Pest mortality may be determined using any appropriate methods, exemplary methods being standard in the art. By way of non-limiting example, pest mortality may be determined using a pathogenicity assay, such as those used in the Examples below.

Dispersal of entomopathogenic nematodes according to the invention may be modified compared with the dispersal of a reference population of the same entomopathogenic nematode in the absence of a wetting agent of the invention. Dispersal may be vertical dispersal and/or horizontal dispersal. References herein to "dispersal" encompass both horizontal and vertical dispersal unless otherwise stated.

Typically, vertical dispersal of entomopathogenic nematodes with wetting agents according to the invention is at least comparable with the dispersal of a reference population of the same entomopathogenic nematode in the absence of a wetting agent of the invention.

Horizontal dispersal of entomopathogenic nematodes with wetting agents according to the invention is at least comparable with the dispersal of a reference population of the same entomopathogenic nematode in the absence of a wetting agent of the invention and is typically improved compared to the dispersal of such a reference population. Horizontal dispersal of entomopathogenic nematodes according to the invention may be increased by at least 10%, at least 20%, at least 30%, at least 50%, at least 75% or more compared with the horizontal dispersal of a reference population of the same entomopathogenic nematode in the absence of a wetting agent of the invention.

Dispersal of the entomopathogenic nematodes may be determined using any appropriate methods, exemplary methods being standard in the art. By way of non-limiting example, vertical dispersal of the entomopathogenic nematodes may be determined using a sand column assay. By way of a further non-limiting example, horizontal dispersal of the entomopathogenic nematodes may be determined by quantifying dispersal across a Sabouraud dextrose agar (SDA) plate. Again, suitable methods using SDA plates are known in the art.

The dispersal of the entomopathogenic nematodes may vary depending on the specific species (exemplary species are described herein). However, preferably for any given entomopathogenic nematode comprised in a pest control kit of the invention, the horizontal dispersal is increased compared with control entomopathogenic nematodes in the absence of the wetting agent composition, more preferably the horizontal dispersal is increased by at least 20% compared with control entomopathogenic nematodes in the absence of the wetting agent composition.

Preferably the pest control kits of the invention provide for increased survival of entomopathogenic nematodes and increased pest mortality as described herein. In some particularly preferred embodiments, the pest control kits of the invention provide for increased survival of entomopathogenic nematodes, increased pest mortality and increased dispersal (particularly horizontal dispersal) as described herein. Without being bound by theory, it is believed that the advantageous properties of the pest control kits of the invention are provided by the wetting agent of the invention, particularly by the solvent and/or surfactant (or combination thereof) comprised in the wetting agent.

BRIEF DESCRIPTION OF THE SEVERAL VIEWS OF THE DRAWINGS

FIG. 1 is a component view of a pest control kit according to the first and fourth aspects of the present invention.

FIG. 2 shows efficacy (%) of *Heterorhabditis bacteriophora* applied alone or with Wetting agent composition (as Pest control kit-C) for the control of Welsh chafer, *Hoplia philanthus* grubs. Trial was conducted at The Grove Golf Club, Watford, London, UK between May 2017 and October 2018. Treatments consisted of: *Heterorhabditis bacteriophora* 2.5 billion/ha applied alone, Pest control kit-C 2.5 billion/ha applied with Wetting agent composition (10 L/ha) and Chlorpyrifos (Equity) 2 L a.i./ha. All treatments were applied using soil injector followed conventional boom sprayer. Soil samples were taken at 2, 4, 6, and 8 weeks post application to assess grub population.

FIG. 3 shows application of nematodes on a golf course for the control of leatherjackets larvae.

FIG. 4 shows the application of nematodes on a golf course by punching holes for the control of leatherjackets larvae.

FIG. 5 shows the preparation and process performed ahead of and during the field trial examples 1 to 6.

FIG. 6 shows efficacy (%) of nematodes (*Steinernema feltiae* for spring and *Steinernema carpocapsae* in autumn) applied alone or with Wetting agent composition (as Pest control kit-L) for the control of leatherjackets larvae. Trial was conducted at Machrihanish golf club, Mull of Kintyre, Scotland, between April 2018 and September 2018. Treatments consisted of: nematodes (*Steinernema feltiae* for spring and *Steinernema carpocapsae* in autumn) 2.5 billion/ha applied alone twice at weekly intervals, Pest control kit—L 2.5 billion/ha applied twice at weekly intervals with Wetting agent composition (10 L/ha) and Chlorpyrifos (Equity) 2 L a.i./ha. All treatments were applied using conventional boom sprayer before aeration of the soil which include making tiny holes size of 0.5 cm diameter. Soil samples were taken at 6 weeks post application to assess larval population.

FIG. 7 shows a trial site, Kings Caple, Herefordshire, England, UK.

FIG. 8 shows efficacy (%) of *Heterorhabditis bacteriophora* alone or with Wetting agent composition (as Pest control kit-H) for the control of black vine weevil (*Otiorhynchus sulcatus*), in field grown strawberries. Treatments consisted of: Metarhizium anisopliae applied as premixed, *Steinernema kraussei* applied with or without Wetting agent composition as a drench, *Heterorhabditis bacteriophora* alone or with Wetting agent composition (as Pest control kit-H) and Chlorpyrifos (Equity). Trial was conducted in sandy soil under polytunnel at Kings Caple, Herefordshire, UK between July and October 2016-17. Each strawberry plant was infected with 30 black vine weevil eggs and plants were destructively assessed 13 weeks post inoculation. Bars displaying the same letters are not significantly different ($P>0.05$); Tukey's test). Each treatment was replicated 4 times with 15 plants/treatment.

FIG. 9 shows comparative efficacy results of insecticide, beneficial insects and Pest control kit-F (*Steinernema feltiae*) for the control of western flower *thrips* (*Frankliniella occidentalis*) in field grown strawberries. Treatments consisted of: insecticide (Tracer—trade mark), Beneficial predatory mite, *Neoseiulus cucumeris, Steinernema feltiae* alone or with Wetting agent composition (as Pest control kit-F). Trial was conducted in sandy soil under polytunnel at Kings Caple, Herefordshire, UK between July and October 2015-17. Strawberry crop was infected with western flower *thrips* (5-20 adults/flowers) and *thrips* number on each flower/plant were counted week 28, 29, 30, 31, 32, 33 and 35 post treatments. Each treatment was replicated 4 times with 15 plants/treatment.

FIG. 10 shows comparative efficacy results of pesticides and Pest control kit—S (*Steinernema feltiae*) for the control of sciarid fly larvae under greenhouse conditions. Treatments consisted of: Carbofuran, Teflubenzuron, *Steinernema feltiae* alone or with Wetting agent composition (as Pest control kit-S). Trial was conducted in mushroom production farm in UK in 2016-17. Mushrooms were naturally infected with sciarid larvae and numbers counted week 1 and 3 post treatments. Each treatment was replicated 4 times with 15 plants/treatment.

FIG. 11 shows efficacy of *Heterorhabditis bacteriophora* alone, *Heterorhabditis downesi* alone and *Steinernema carpocapsae* alone or with Wetting agent composition (as Pest control kit-T) for the control of pine weevil larvae in Sitka spruce. Treatments consisted of: *Heterorhabditis bacteriophora* alone, *Heterorhabditis downesi* alone, *Steinernema carpocapsae* alone, and *Steinernema carpocapsae*+Wetting agent composition (as Pest control kit-T). Nematodes applied at 3.5 million/stump in 500 mL of water as drench. Trial was conducted on Sitka spruce stumps at Tywi North forest, Ceredigion, Wales between June and August 2016-17. Each stump was destructively assessed 4 weeks after treatment application. Each treatment was replicated 5 times with 5 stumps/treatment. FIG. 12 provides a flow chart depicting a method of controlling a population of larval insects according to the second and third aspects of the present invention.

With reference to FIG. 1, there is provided a component view of a Pest control kit 10 according to the first and fourth aspects of the present invention. The pest control kit 10 comprises an amount of entomopathogenic nematodes 12, a wetting agent composition 14, and a training package 16. In the embodiment shown, the amount of entomopathogenic nematode comprises *Steinernema feltiae* in an amount of 2.5 billion organisms per hectare of land to be treated. The organisms are arranged to be stored below 8° C., below which temperature the *Steinernema feltiae* remain substantially labile. Above 8° C., *Steinernema feltiae* become active and infective. The wetting agent composition 14 comprises a liquid comprising dipropylene glycol methyl ether 10%, polyethylene glycol surfactants 3%, and soil penetrants. The training package 16 is arranged to permit a user to perform a method of controlling a population of insects according to the second and third aspects.

Definitions

Unless otherwise defined herein, scientific and technical terms used in connection with the present invention shall have the meanings that are commonly understood by those of ordinary skill in the art. The meaning and scope of the terms should be clear; however, in the event of any latent ambiguity, definitions provided herein take precedent over any dictionary or extrinsic definition. It should be understood that this invention is not limited to the particular methodology, protocols, and reagents, etc., described herein and as such can vary. The terminology used herein is for the purpose of describing particular embodiments only and is not intended to limit the scope of the present invention, which is defined solely by the claims. Further, unless otherwise required by context, singular terms shall include pluralities and plural terms shall include the singular. In this application, the use of "or" means "and/or" unless stated otherwise. Furthermore, the use of the term "including", as well as other forms, such as "includes" and "included", is not limiting.

The description of embodiments of the disclosure is not intended to be exhaustive or to limit the disclosure to the precise form disclosed. While specific embodiments of, and examples for, the disclosure are described herein for illustrative purposes, various equivalent modifications are possible within the scope of the disclosure, as those skilled in the relevant art will recognize. For example, while method steps or functions are presented in a given order, alternative embodiments may perform functions in a different order, or functions may be performed substantially concurrently. The teachings of the disclosure provided herein can be applied to other procedures or methods as appropriate. The various embodiments described herein can be combined to provide further embodiments. Aspects of the disclosure can be modified, if necessary, to employ the compositions, functions and concepts of the above references and application to provide yet further embodiments of the disclosure. Moreover, due to biological functional equivalency considerations, some changes can be made in protein structure without affecting the biological or chemical action in kind or amount. These and other changes can be made to the disclosure in light of the detailed description. All such modifications are intended to be included within the scope of the appended claims.

The publications discussed herein are provided solely for their disclosure prior to the filing date of the present application. Nothing herein is to be construed as an admission that such publications constitute prior art to the claims appended hereto.

EXAMPLES

Specific embodiments will now be described by way of example only, and with reference to the accompanying drawings.

Example 1—Comparative Studies of a NemaSpreader® with Commercially Available Wetting Agents Wetting agents as a class of compounds are readily commercially available, with some (e.g. H2Pro) even advertised as suitable for use with entomopathogenic nematodes. The survival of different nematode species following exposure to different wetting agents was examined. These wetting agents include commercially available wetting agents and a wetting agent according to the present invention (NemaSpreader©).

The final concentrations of wetting agent used were equivalent to those prescribed under manufacturer recommendations for field applications. The amount of 15 ml of the nematode solution was added to a tissue culture flask (50-ml capacity) with 15 ml of each wetting agent, thus the total volume made was 30 ml containing approximately 93,750 IJs (equivalent to field application of 2.5×109 IJs/ha in 800 L water). For control, 15 ml distilled water was added to the nematode solution in place of the wetting agent. Each treatment was replicated three times. The tissue culture flasks were kept at 20±2° C. in dark.

The viability of nematodes was assessed at 3, 6 and 24 h through removal of 3×20 μl aliquots from each suspension and live nematodes were counted using the binocular microscope (Olympus). Nematodes were determined as dead if the following criteria were observed: (i) lack of movement, (ii) initial signs of decomposition and/or the formation of bubbles within the nematode, (iii) lack of response to physical stimulation. The whole assay was repeated twice.

As shown in Table 1 below, the NemaSpreader® wetting agent according to that required for the first aspect of the present invention is compatible with nematode species selected from the group: *Heterorhabditis bacteriophora; Heterorhabditis downesi; Steinernema feltiae; Steinernema carpocapsae; Steinernema kraussei*. Nematode survival post 24-hour exposure to said wetting agent did not fall below 90%. In contrast, at 24-hours post exposure the survival of the test nematode species was significantly reduced across the range of conventional wetting agents analysed.

Therefore, contrary to conventional knowledge, the choice of wetting agent can have a significant impact on the survival/viability of nematodes, and the selection of a specific wetting agent is key to pest control efficacy of products and kits containing entomopathogenic nematodes.

In addition, in further comparative studies post-exposure pathogenicity was assessed against greater wax moth, *Galleria mellonella*, larvae at 24 h post-exposure. Nematodes exposed to the tested adjuvants from the compatibility assays were washed three times to remove any residual wetting agent from the nematode body. One milliliter of the nematode solution from each treatment was placed into a 1.5 ml microcentrifuge tube and spun at 3,000 rpm for 7 min. The supernatant containing any excess wetting agent was discarded, and the nematodes resuspended using 1 ml of distilled water. The process was repeated 3 times for each of the treatment types. Counts were again conducted for each re-suspension of nematodes to determine the concentration present, and the volumes were adjusted to obtain a conc. of 500 nematodes in 900 μl water for each treatment.

Five *G. mellonella* larvae were placed into a 90 mm diameter petri dish lined with a Whatman® filter paper. The 900 μl nematode suspension was then evenly distributed over the filter paper before sealing the lid with Parafilm™. There were two control conditions tested; *G. mellonella* challenged with nematodes unexposed to any wetting agent, and blank controls, whereby *G. mellonella* larvae were exposed to filter paper treated with distilled water only. Petri dishes were stored at 25±1° C. in the dark. The mortality was recorded daily until all the insects were dead. All nematode-infected cadavers were transferred to petri dishes lined with moist filter paper and kept at 25±1° C. for 3 days, after which the cadavers were dissected and viewed under a light microscope to verify the presence of nematodes. Each treatment was replicated 3 times with 5 larvae per replication and conducted twice.

Post-exposure pathogenicity (insect mortality) of said nematodes did not fall below 90% following 72 hours post exposure to the wetting agent (data not shown).

In addition, vertical dispersal of said nematodes through a test medium (sand column) using the wetting agent was also tested (30 mL wetting agent was added to 350 g sand in a hi-ball glass (Wilkinson, UK), and vertical dispersal of over 80% of the depth of the hi-ball glass was achieved using the wetting agent (data not shown). Horizontal dispersal was also assessed using SDA plates. Two concentric circles were drawn at 1.0 cm and 3.5 cm from the center point of the plate on 9 cm diameter petri dish on Sabouraud Dextrose Agar (SDA) plates. The 20 µl aliquots of nematode-wetting agent, at the same concentrations as the compatibility assay, were added to the center point of the dish. Dishes were then sealed with Parafilm and stored in the dark at 21±2° C. for 2 hours, after which the nematodes, migrated to each zone; (i) 0-1.0 cm from center of petri plate; (ii) 1.0-3.5 cm, and (iii) 3.5-4.5 cm), were counted to assess their movement away from the point of the placement. An observable increase in dispersal to zone II was observed for all nematode species tested using a wetting agent according to the present invention compared with the blank control.

Thus, the wetting agent of the invention outperformed alternative products (including a first alternative product—comprising alcohols, C6-12, ethoxylated 5-10%, propane-1,2-diol, propoxylated 1-3%; and a second alternative product comprising alcohol ethoxylate 19.4% (nonionic surfactant); proprietary mixture+alcohol, C11-15-secondary, ethoxylated 15-20%+Orange, sweet, ext. proplyne glycol 5-10%) in compatibility, post-exposure pathogenicity and dispersal studies.

Thus, the choice of wetting agent is important as it can affect other aspects of the pest control product/kit (such as nematode pathogenicity and dispersal) and thus the pesticidal efficacy. The following examples describe field studies of the present pest control kit according to the first aspect of the present invention carrying out the method according to the second aspect.

TABLE 1

Compatibility of entomopathogenic nematodes with different adjuvant solutions.

| | 3 h | | | | | 6 h | | | | | 24 h | | | | |
|---|---|---|---|---|---|---|---|---|---|---|---|---|---|---|---|
| Treatments | Sc | Sf | Hb | Sk | Hd | Sc | Sf | Hb | Sk | Hd | Sc | Sf | Hb | Sk | Hd |
| Control | 100 | 100 | 100 | 100 | 100 | 99.1 | 100 | 97.6 | 97.5 | 98.6 | 95.2 | 100 | 93.5 | 94.7 | 95.8 |
| NemaSpreader 2.86% | 100 | 100 | 100 | 100 | 100 | 99.1 | 100 | 97.6 | 97.5 | 98.6 | 95.2 | 100 | 93.5 | 94.7 | 95.8 |
| OARS Ps 0.4% | 98.2 | 99.7 | 92.9 | 92.2 | 98.7 | 93.7 | 96.1 | 89.3 | 89.5 | 97.8 | 88.9 | 82.0 | 86.4 | 87.3 | 60.2 |
| OARS Ps 0.2% | 98.0 | 96.7 | 94.3 | 93.1 | 98.1 | 94.6 | 95.3 | 87.1 | 89.8 | 97.2 | 87.9 | 81.6 | 88.6 | 87.4 | 87.7 |
| PBS150 0.2% | 99.2 | 98.1 | 91.3 | 90.7 | 98.4 | 94.4 | 93.5 | 86.9 | 87.2 | 98.8 | 87.3 | 82.5 | 83.2 | 82.6 | 94.7 |
| OARS Ps 0.8% | 96.1 | 97.4 | 89.9 | 93.5 | 100 | 93.0 | 95.0 | 87.8 | 90.7 | 97.8 | 82.7 | 84.8 | 84.0 | 84.3 | 94.2 |
| Penterra 0.5% | 97.4 | 97.3 | 97.0 | 92.3 | 97.7 | 84.6 | 93.7 | 85.5 | 89.1 | 75.5 | 88.1 | 83.2 | 74.9 | 82.8 | 74.3 |
| H2ProLiquid 2% | 95.3 | 96.8 | 93.3 | 92.4 | 96.4 | 91.1 | 91.9 | 86.9 | 89.2 | 98.5 | 87.5 | 81.2 | 83.3 | 85.8 | 43.3 |
| PBS150 0.4% | 95.6 | 98.2 | 90.2 | 90.4 | 99.3 | 93.6 | 94.1 | 85.9 | 86.2 | 96.3 | 86.4 | 78.7 | 80.9 | 82.3 | 94.6 |
| Dispatch 0.67% | 94.8 | 96.5 | 93.1 | 91.4 | 97.9 | 90.3 | 91.4 | 89.3 | 88.6 | 96.2 | 84.8 | 81.7 | 76.4 | 85.2 | 84.9 |
| TricureAD 2% | 93.9 | 95.1 | 92.2 | 92.2 | 98.9 | 90.1 | 93.0 | 86.7 | 86.9 | 91.8 | 89.9 | 91.3 | 82.2 | 85.6 | 82.9 |
| 50-90 2.4% | 93.2 | 95.7 | 90.8 | 92.6 | 98.7 | 91.2 | 93.0 | 84.4 | 89.4 | 97.7 | 86.3 | 89.2 | 43.9 | 84.9 | 95.4 |
| OARS Ps 2.5% | 94.3 | 93.6 | 87.5 | 93.2 | 97.7 | 90.0 | 84.0 | 87.6 | 90.1 | 93.0 | 86.0 | 82.8 | 85.0 | 86.6 | 56.1 |
| PBS150 0.8% | 93.5 | 96.2 | 88.7 | 89.3 | 98.0 | 91.3 | 91.9 | 82.2 | 85.1 | 94.4 | 84.2 | 69.9 | 73.7 | 81.2 | 95.2 |
| Revolution 2.38% | 93.5 | 95.4 | 88.4 | 89.2 | 98.5 | 84.2 | 91.0 | 84.2 | 86.2 | 97.0 | 64.8 | 55.3 | 56.8 | 84.8 | 94.9 |
| TricureAD 3.3% | 90.6 | 94.8 | 92.2 | 89.0 | 97.0 | 89.0 | 90.7 | 85.5 | 86.7 | 97.1 | 81.6 | 85.2 | 51.1 | 85.2 | 86.3 |
| Transformer 1% | 90.7 | 95.6 | 90.7 | 55.8 | 98.1 | 77.9 | 80.1 | 82.0 | 63.1 | 98.3 | 32.2 | 5.2 | 8.2 | 1.5 | 7.4 |
| Transformer 2% | 89.1 | 92.8 | 88.8 | 73.2 | 96.4 | 77.6 | 83.1 | 80.3 | 69.2 | 91.6 | 7.9 | 2.0 | 5.5 | 0.0 | 0.3 |
| H2Pro 2% | 20.7 | 12.0 | 9.4 | 1.1 | 2.4 | 43.1 | 2.4 | 5.9 | 1.1 | 0.4 | 6.3 | 2.1 | 2.0 | 1.0 | 0.0 |

Example 2—Control of Chafer Grubs in Golf Course

Field trials were conducted on a naturally infested tees, green and fairways containing a mixture of Welsh chafer, *Hoplia philanthus* (90%), Garden chafer, *Phyllopertha horticola* (3%), Summer chafer, *Amphimallon solstitialis* (1%), May beetle, *Melolontha* (4%) and wireworms *Agriotes* species (3%) at The Grove Golf Club, Watford, and Ashridge Golf Club, Berkhamsted, UK. The soil composed of sandy loam containing 88.0% sand, 5.6% silt, 6.4% clay with 5.8% organic matter. No natural nematodes were detected by baiting soil samples with *Galleria mellonella* larvae.

One week before treatment, the pre-treatment larval density was determined in tees, greens and fairways (see FIG. 4) by taking three 16×16×10 to 15 cm soil plugs with a shovel or golf Hole Cutter (10 cm diameter). The living larvae were counted and expressed as number of larvae per square meter. The grubs were then placed back in the soil plug, which was returned to its original place.

*Heterorhabditis bacteriophora* (for use in Pest control kit-C) with and without a wetting agent composition according to the first aspect of the present invention (liquid pre-mixed form:dipropylene glycol methyl ether 5-10%, polyoxyalkylene glycol surfactants, and soil penetrants) were applied using a soil injector mounted tractor (see FIG. 3) followed by boom sprayer to treat 10 ha of tees, greens and fairways at The Grove Golf Club in Spring and Autumn 2017-18 (soil temperature at 7 cm depth 14.5-18.0° C.; air temperature 14-20° C.; clear day). A reference chemical product Chlorpyrifos was applied using boom sprayer at the same time.

The treatments included:
1. *Heterorhabditis bacteriophora* alone 2.5 billion per hectare applied twice at a weekly interval;
2. A pest control kit according to the first aspect of the present invention comprising 2.5 billion *Heterorhabditis bacteriophora* per hectare+5 litre final mixed wetting agent composition (liquid form diluted to 500 litres of water; 1% v/v) (Pest control kit-C) applied twice at a weekly interval;
3. Chlorpyrifos (2 litres active ingredient per hectare) applied only once; and
4. Untreated control.

The larval density after treatment was determined 2, 4, 6, or 8 weeks after nematode or chlorpyrifos application.

Results

Figure 2:
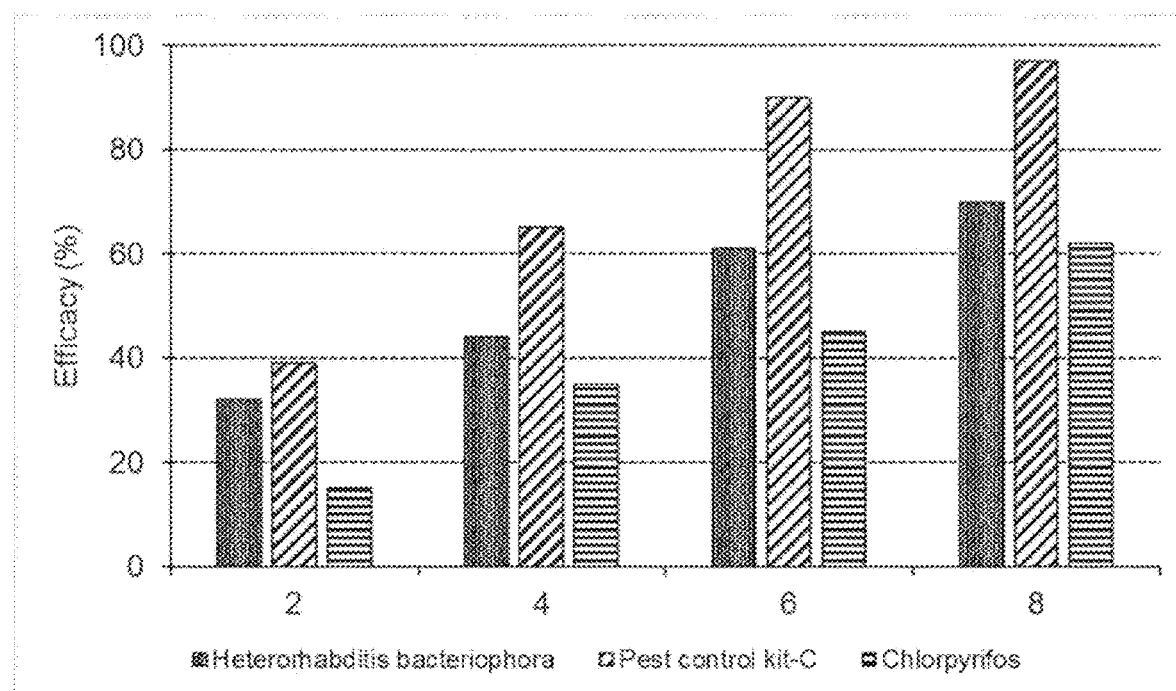

Overall the combined pest control product according to the first aspect (*Heterorhabditis bacteriophora* with the wetting agent composition—Pest control kit-C) provided better control at 2, 4, 6 and 8 weeks after treatment compared with chemical or nematode applied alone. The combined pest control product provided 97% control. The nematode alone provided 70% and chemical 62%. We noticed a progressive control of grubs in their natural environment (see FIG. 2).

Example 3—Control of Leatherjackets Larvae in Golf Course

The leatherjacket (*Tipula* spp.) is the larval stage of the crane fly and can be a very difficult soil-dwelling pest to control. The larvae feed on the roots of a wide range of plants such as cereal crops and various types of grass in golf courses, sports fields and lawns. Adult insects hatch from their pupae with the soil from mid-August onwards. Females copulate and lay eggs just below the moist soil surface and two weeks later the larvae begin to hatch. Larvae feed on plant foliage at night and the roots during daytime.

Field trials were conducted on a naturally infested green containing larvae of *Tipula* species (100%) at Machrihanish Golf Club, Scotland, UK. The soil composed of sandy loam containing 85% sand, 4.5% silt, 5% clay with 5.5% organic matter. No natural nematode was detected by baiting soil samples with *Galleria mellonella* larvae.

One week before treatment, the pre-treatment of *Tipula* spp. larval density was determined in greens by taking six soil plugs per green with a golf Hole Cutter (10 cm diameter). The living larvae were counted and expressed as number of larvae per square meter. The larvae were then placed back in the soil plug, which was returned to its original place.

Figure 3:
Figure 4:
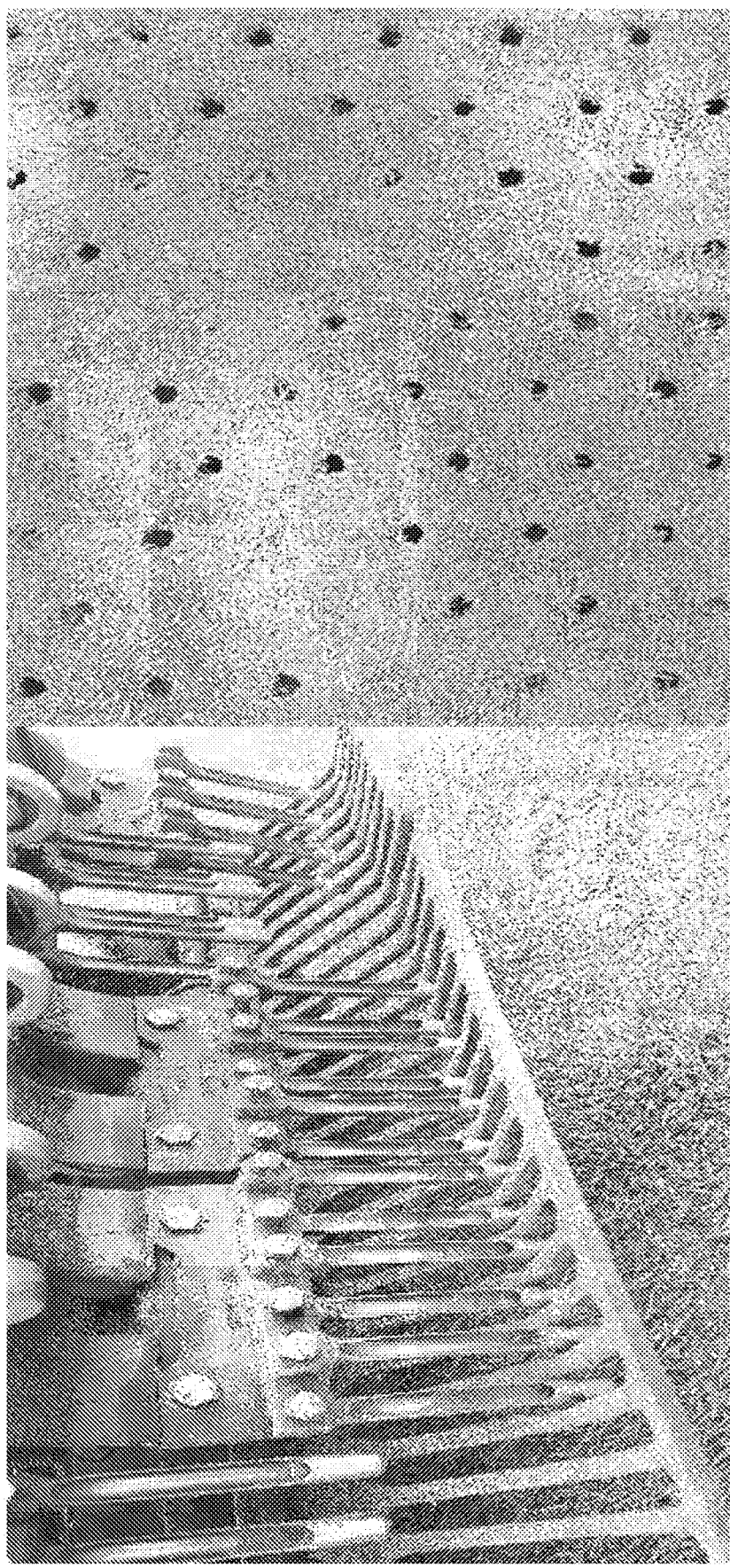
Figure 5:

*Steinernema feltiae* and *Steinernema carpocapsae* (Pest control kit-L) were applied in equal proportion with and without a wetting agent (liquid form:dipropylene glycol methyl ether 5-10%, polyoxyalkylene glycol surfactants and soil penetrants) according to the first aspect of the present invention (liquid form:dipropylene glycol methyl ether 5-10%, polyoxyalkylene glycol surfactants and soil penetrants) using a boom sprayer same as that described in FIG. 3. In order to deliver nematode to the target below the surface, 24 hours before punching little holes (0.5-1.0 cm diameter×5-7 cm depth) by soil injector (FIG. 4) into greens was done to help nematode suspension reaching below the grass or thatch layer.

Two hectares of the greens were treated in April 2018 and at the end of September 2018. A reference chemical product Chlorpyrifos was applied using the boom sprayer at the same time.

The treatments included:
1. *Steinernema feltiae* (spring) or *Steinernema carpocapsae* (autumn) 2.5 billion per hectare (2.5 billion each species) applied twice at a weekly interval;
2. A pest control kit (Pest control kit-L) according to the first aspect of the present invention comprising *Steinernema feltiae* or *Steinernema carpocapsae* 2.5 billion
3. per hectare (2.5 billion each species)+10 L final mixed wetting agent composition (liquid form diluted to 1% v/v) applied twice at a weekly interval;
4. Chlorpyrifos (2 litres active ingredient per hectare) applied only once; and
5. Untreated control.

The larval density after treatment was determined 4 or 8 weeks after nematode or chlorpyrifos application.

Results

Figure 6:
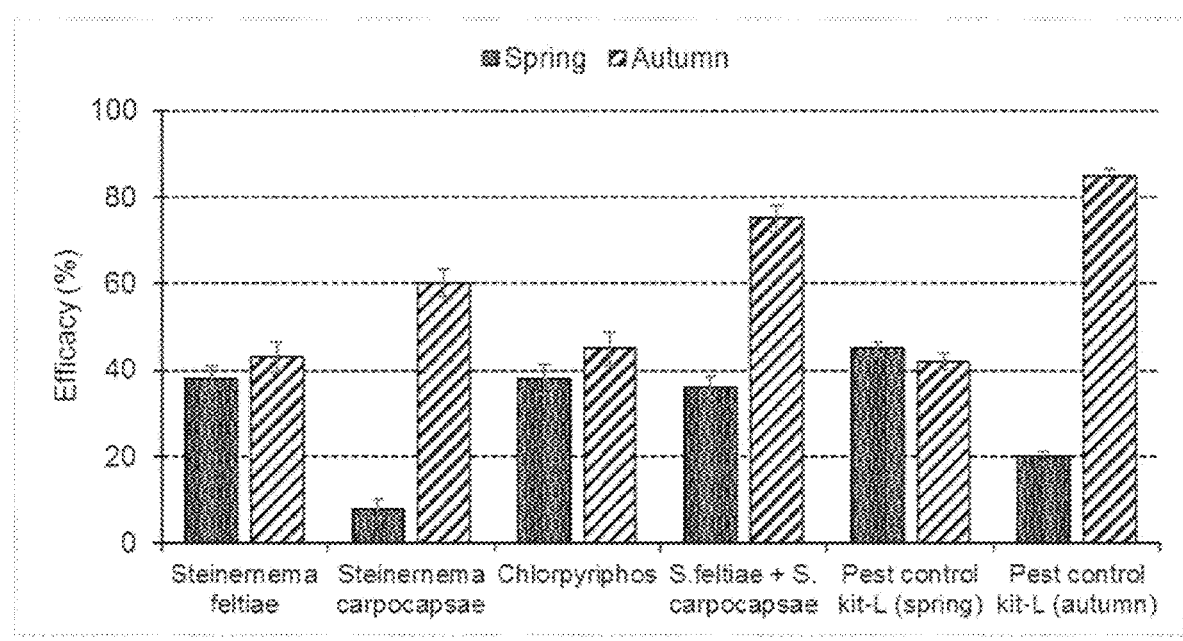

The efficacy of the pest control kit according to the first aspect were compared with the nematode alone and the chemical alone for leatherjacket larvae control in field conditions. The performance of the pest control kit was better (85%) during autumn; however, its effectiveness was on hold (20%) during Spring season. The combined application of *Steinernema feltiae* and *Steinernema carpocapsae* gave the second-best efficacy (75%) when compared with other treatments of chlorpyriphos, *Steinernema feltiae* or *Steinernema carpocapsae* (FIG. 6).

Example 4—Control of Vine Weevil in Soft Fruits (Field Grown Strawberry)

Figure 7:

A trial was conducted in a polytunnel on a commercial strawberry farm at Pennoxstone Court, Kings Caple, Hereford, England, UK from July to October 2016 (FIG. 7). The soil at this site was sandy loam. The site had not been treated with insecticides during the previous year. No natural populations of nematode were detected at the trial sites as determined using the "Galleria bait method". This method entails incubation of larvae of *Galleria mellonella* in the soil where these readily succumb to nematodes, if present. This method provides a convenient way of studying natural and introduced populations of nematodes.

Crop variety (s): Centenary (plug) and Symphony (bare roots)
Soil type: Sandy loam
Test block size: 1.5×0.9 m with a 0.3 m buffer between plots
Replication: 4×15 plants/treatment The plots measured 1.5 m×0.9 m with a 0.3 m buffer and were arranged in a complete randomized block design with 4 replicates per treatment (EPPO standard PP1/181). The strawberry plants were planted on 7 July 2016 and vine weevil eggs were inoculated on 14 July and 22 August 2016. On the day of treatment, the weather was partially cloudy with the air and soil (at 7 cm depth) temperatures being 25° C. and 20° C., respectively. Each treatment was replicated 4 times with 15 plants per replicate. The following treatments were applied:
1. Met52® G bioinsecticide applied at 120 kg per hectare before planning;
2. *Steinernema kraussei* applied at 30,000 per plant;
3. *Heterorhabditis bacteriophora* applied at 30,000 per plant;
4. Chlorpyriphos applied at 2.0 litre per hectare;
5. A pest control kit according to the first aspect of the present invention comprising *Steinernema kraussei* applied with wetting agent composition (liquid form of: dipropylene glycol methyl ether 5-10%, polyoxyalkylene glycol surfactants and soil penetrants—diluted to 1% v/v);
6. A pest control kit according to the first aspect of the present invention comprising *Heterorhabditis bacteriophora* (Pest control kit-H) applied with the above wetting agent composition (liquid form diluted to 1% v/v); and
7. Untreated control.

Test System

First egg inoculation was done on 14 Jul. 2016, 10 eggs were inoculated on each side of the plant (total 20 eggs/plant). A second egg inoculation was done on 22 August, 10 eggs per plant. This was done making sure the soil was moist at the time of inoculation. The surface crust around the plant base was broken up and two holes (2-3 cm deep in soil) were made on each side of the plant. Immediately after inoculation, the hole was closed loosely with soil and each plant received approximately 100 mL of irrigation water to protect eggs from desiccation.

Application of Treatments

Met 52®G

The granular formulated product, Met52® G was first mixed in 1.0 litre of soil then vigorously shaken for 5 minutes to dislodge the spores from the rice grain. This mix was then spread over the soil surface before being mixed into the top 5 cm of soil. The rates were in accordance with the manufacturer's recommendation rate for vine weevil control which range between 30 to 122 kg/ha of product=$4.5 \times 10^{13}$ to $1.35 \times 10^{14}$ CFU/ha (the UK approved rate is up to 61 kg/ha of crop, not treating paths and non-crop area). After premixing, strawberry was planted, and each plant received 200 mL of irrigation.

Application of Nematode Products

Nematodes were applied using a Dosatron® which offers a constant injection ratio and uniform and proportional injection, adding flexibility to simple or automated systems, so that the nematode can be easily applied near plant roots.

Destructive Assessment

Plants were destructively assessed on 12-16 Oct. 2016 and the number of live larvae was counted. The majority of larvae were found close to the plant's roots but were also found further away from the plants in the soil. The recovered larvae for the treated plots were then transferred to the laboratory and placed on a moist filter paper in petri dishes (9 cm diameter) and incubated at 25° C. (100% r.h. for 3-5 days). The cause of death was confirmed by examination of the fungal sporulation of the cadaver or dissection under a microscope to confirm nematode presence.

Environmental Factors

During the trials, all plants received regular irrigation through capillary tubes. Plants were exposed to the same biotic (pest pressure, plant diseases, etc.) and abiotic (light intensity, temperature, water availability, etc.) factors as the commercially grown plants at the location. The trial was conducted between June and October 2016. Soil and air temperature were recorded during the trial period using a Tinytag® data logger.

Results

Figure 8:
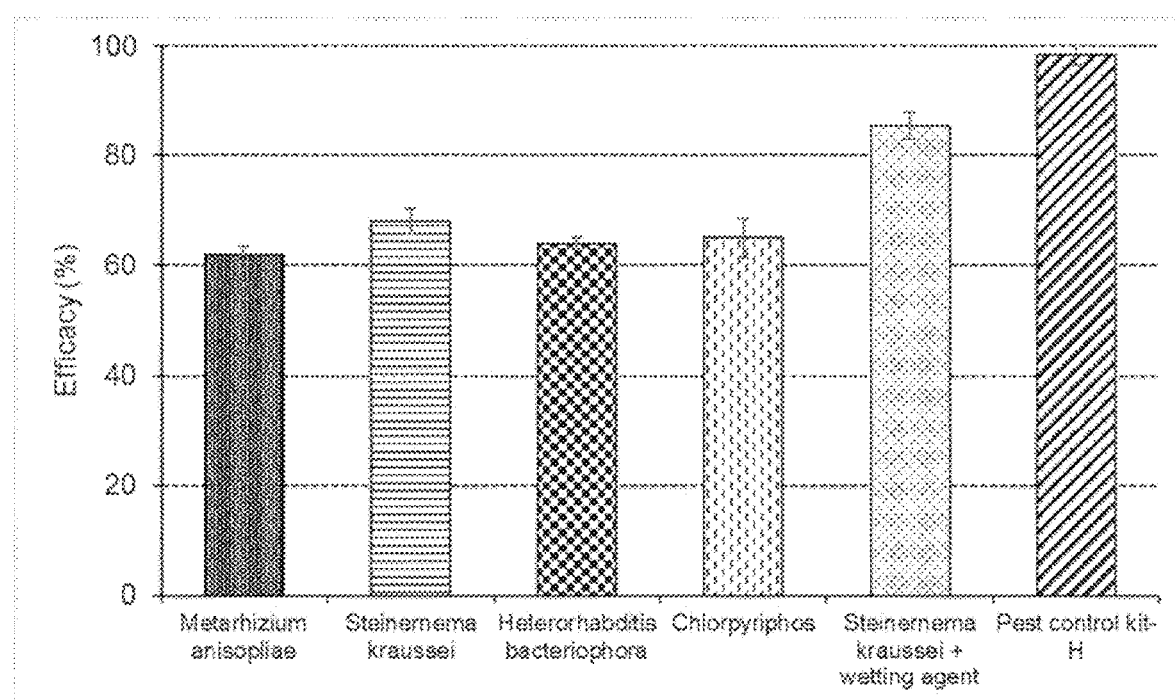

The pest control kit comprising *Heterorhabditis bacteriophora* caused the highest mortality (98%) when applied with wetting agent composition compared with other treatments (60-82%). *Steinernema kraussei* also provided good control when applied with the wetting agent composition (85.5%). All other treatments were similar and provided 60-68% suppression of vine weevil larvae (see FIG. 8).

Example 5—Control of Western Flower *Thrips* in Strawberry Crops

Western flower *thrips*, *Frankliniella occidentalis*, is a major pest on a global scale. They cause damage to an extensive variety of economically important crops through its feeding habits and through the transmission of harmful plant viruses including the spotted wilt virus in tomato plants. The larvae and adults feed on almost any flowering plant including *capsicum*, cucumber, lettuce, potatoes, tomatoes, strawberries, some stone fruit and a wide range of ornamentals. This results in malformed fruit, often referred to as cat facing, which is unacceptable to the consumer. This pest has become resistant to many existing insecticides and most of the biological control agents that target the foliage-inhibiting stages. However, the pest control kit according to the first aspect of the present invention comprising *Steinernema feltiae* (Pest control kit-F) was applied to target the soil dwelling stages of the insect (prepupa and pupa) and subsequently prevented population growth.

The pest control kit comprising *Steinernema feltiae* is effective against pre-pupae and pupae but less effective against larvae (L2). Field trials were conducted at a commercial strawberry farm, Pennoxstone Court, Kings Caple, Hereford, England, UK in summer 2015-16. In order to standardize the different experiments, the EPPO Guideline for efficacy evaluation of insecticides, PP 1/85(3) "*Thrips* on outdoor crops", was followed as far as possible. Plot size of at least 20 square metre were observed, with four replicates per treatment. The following treatments were applied using drip irrigation with a Dosatron®:
1. Untreated control;
2. Known chemical insecticide: Tracer® 150 mL/ha applied on foliage;
3. Beneficial predatory mites and bugs applied on the foliage;
4. *Steinernema feltiae* applied alone; and
5. A pest control kit (Pest control kit-F) according to the first aspect of the present invention comprising *Steinernema feltiae* applied at one fourth of the recommended dose (0.625 million per ha) with a wetting agent composition (liquid pre-mixed form:dipropylene glycol methyl ether 5-10%, polyoxyalkylene glycol surfactants and soil penetrants) diluted to 1% v/v in 1 L/100 L of water.

All treatments were applied with 1000 L water/ha. Starting from the beginning of June (week 24), the plants were treated in weekly intervals, up to six times. Western Flower *Thrips* population was monitored by deploying yellow sticky trap—the numbers of live *thrips* adults adhered to the yellow sticky traps were counted at weekly intervals using a hand-held magnifying lens.

Results

Figure 9:
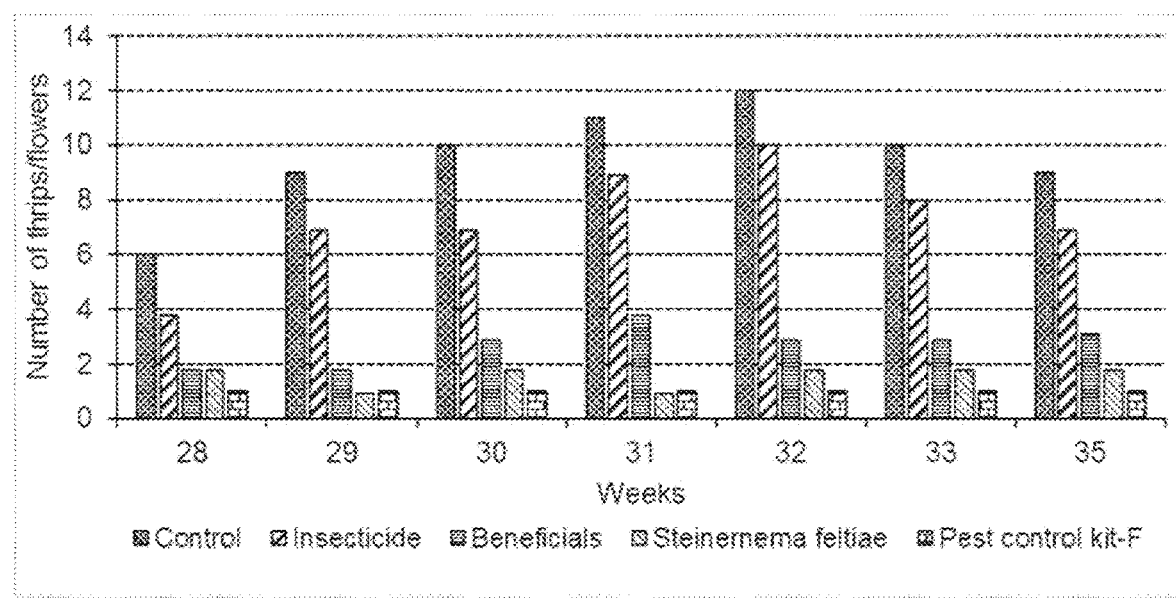

*Steinernema feltiae* treatment with or without the wetting agent composition kept the *thrips* population to less than two individuals on each flower compared with other beneficial or insecticide. The highest number of *thrips* population was noted in control and 6 to 12 individuals per flower were found during the course of 28 to 35 weeks of observation (FIG. 9).

Example 6—Control of Sciarid Fly Larvae in Mushroom

Fungus gnats, also known as sciarid flies, found on and around growing media, are a major pest for greenhouse and polytunnel ornamental crops. The sciarid fly larvae are responsible for causing damage to an extensive variety of economically important potted plants directly through feeding on roots and stalk tissue of seedlings, cuttings and younger plants. They also cause damage indirectly through the transmission of fungal disease through the wounds caused by sciarid larvae. Pot plants known to be susceptible to sciarid attack include Poinsettia, Azalea, Cyclamen, Kalanchoe, Exacum, Gerbera, Begonia and others. All kinds of young plants and young rooted cuttings (vegetables, ornamentals and young nursery plants) are highly susceptible to sciarid larvae. One of the most important areas of use are potted herbs (e.g. Basil). With increasing use of compost in potting soil, sciarids are becoming a major problem. Field trials were conducted to evaluate the following treatments for the control of sciarid larvae in mushroom production:
1. Untreated control;
2. Chemical pesticide carbofuran applied according to recommended usage;
3. Chemical pesticide teflubenzuron applied according to recommended usage;
4. *Steinernema feltiae* applied alone; and
5. A pest control kit according to the first aspect, comprising *Steinernema feltiae* (Pest control kit-F) applied at 2.5 billion per hectare+a wetting agent composition (liquid form:dipropylene glycol methyl ether 5-10%, polyoxyalkylene glycol surfactants and soil penetrants) diluted to 1% v/v in 1 L/100 L of water.

Mushrooms were harvested for up to 4 weeks and number of dead and live larvae were counted.

Results

Figure 10:
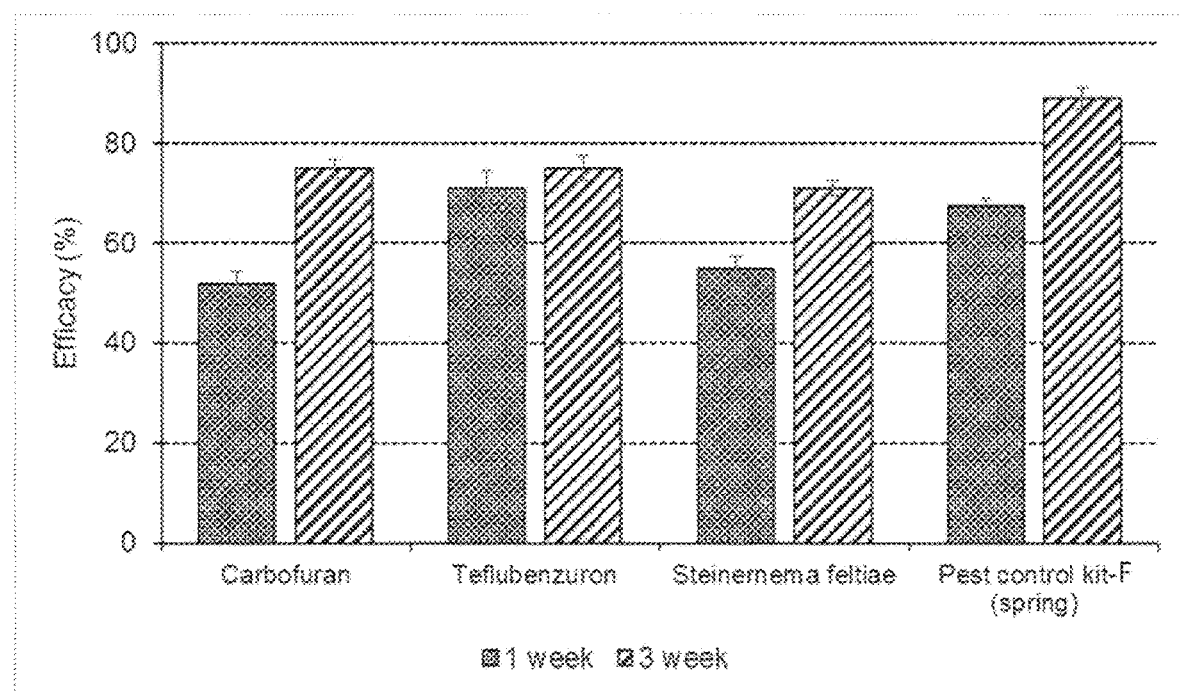

Overall, all the treatments resulted in 52 to 89% sciarid fly larvae control. The significant efficacy was achieved by the pest control kit (89%) after 3 weeks of post-application. The control of larvae on first week of application was highest in Teflubenzuron (71%) followed by the pest control kit (68%) in week 3 (FIG. 10).

Example 7—Control of Pine Weevil Control in Forest

The large pine weevil, *Hylobius abietis*, is the one of the most important pests to reforestation in managed forests across Europe and UK. The cost of the damage caused by *Hylobius abietis* is estimated to be €150 million in the EU (without pesticide use) and €2.57 million per annum in the UK alone.

Field trials were conducted to test the efficacy of various pest control kits according to the present invention against late instar larvae and pupae of pine weevil in Sitka spruce, *Picea sitchensis* stumps, at Tywi North Forest, Mid Wales during June to August 2016-17. The plots consisted of stumps and were arranged in a complete randomised block design with each stump adequately spaced to avoid cross-contamination (EPPO standard PP1/181). The treatments were applied as listed below. Each treatment was replicated 5 times with 5 stumps per replicate. On the days when the treatments were applied, weather was partially cloudy with an average stump temperature of 13.0° C. and 13.3° C. for the first and second set of treatments, respectively. Sitka spruce stumps naturally infected with large pine weevil larvae were selected. On 6 Apr. 2016, before the start of the trial, two stumps from each plot were destructively assessed to determine the natural pine weevil infestation. Approximately ten pine weevil larvae were recovered per stump and no natural infection from nematodes was recorded.

The following treatments were applied with and without wetting agent (liquid form:dipropylene glycol methyl ether 5-10%, polyoxyalkylene glycol surfactants and soil penetrants). The treatment provided with wetting agent constituted pest control kits according to the present invention. Each stump was treated with a drench application of 500 mL of water containing Wetting agent composition and 3.5 million nematodes.
1. Untreated control;
2. *Heterorhabditis bacteriophora* drench at 3.5 million per stump;
3. *Heterorhabditis downesi* drench at 3.5 million per stump;
4. *Steinernema carpocapsae* drench at 3.5 million per stump; and
5. *Steinernema carpocapsae* drench at 3.5 million per stump+wetting agent composition (liquid form) diluted to 1% v/v in 1 L/100 L water (Pest control kit-T).

Destructive Assessment

The treated stumps were destructively assessed 4 weeks after application of the nematodes. The destructive assessment was done by carefully removing the all the bark of the stump up to 30 cm down. This included below the soil surface where necessary. For each stump the total number of *Hylobius abietis* that were found in the bark and the bark/wood interface were recorded. The life stage (larvae, pupae or adult); if the organism was dead or alive; the cause of death with nematode or any other relevant information about the stump was also recorded. While each stump was being assessed the diameter (ranged from 20-55 cm) of the stump was also recorded. Live larvae, pupae and adults were collected and kept in plastic boxes with untreated soil and taken to the laboratory. These larvae, pupae and adults were cleaned with water and ethanol to remove any surface microorganisms that could cause mortality. The larvae were then placed on moist filter paper, with five larvae per dish and left at room temperature. Mortality was recorded at 24-hour intervals as well as cause of death and any other relevant information. After one-week, dead insects that did not show typical symptoms were dissected under a microscope to check for the presence of nematodes. Where possible other information such as quantity of nematodes if they were alive; lipid content and any co-infection from other nematodes were recorded.

The trial was conducted between June and August 2016-17. Treated stumps were exposed to the natural environment without any interference. Stump temperature was recorded during the trial period using a Tinytag® data logger. The daily mean maximum, minimum, and average stump temperatures were recorded during the trial period.

Results

Figure 11:
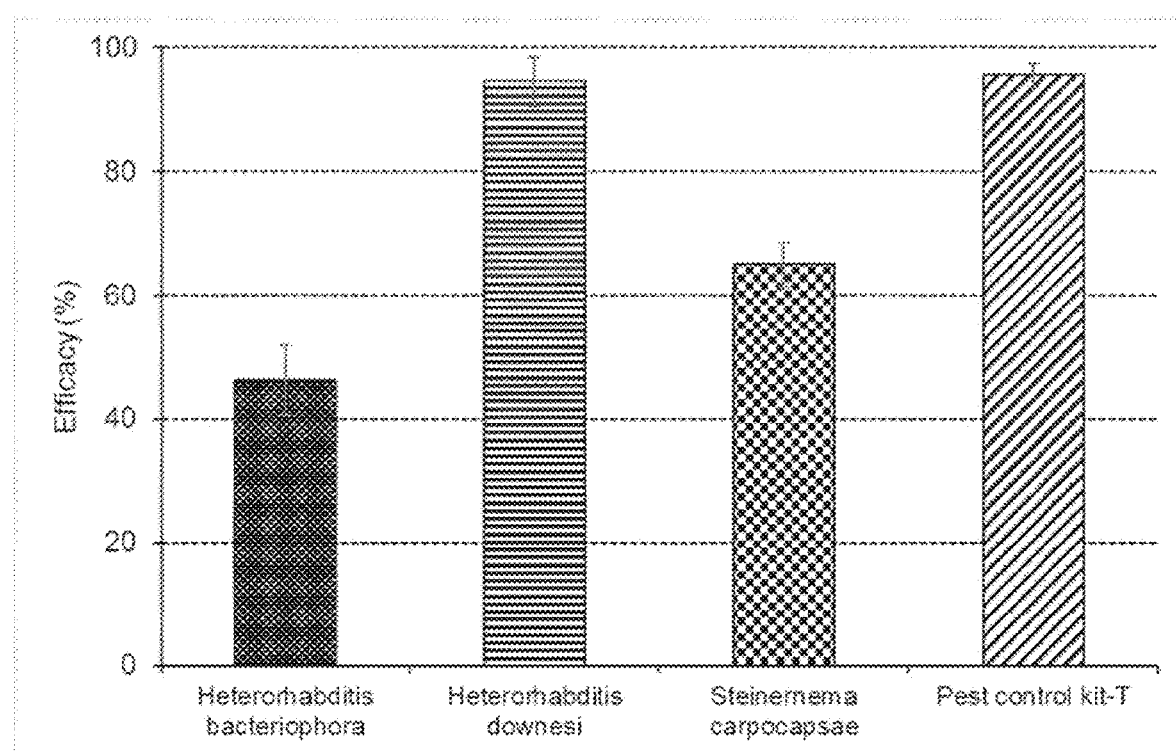

Overall, control of pine weevil differed significantly among different treatments (P<0.001). The pest control kit (comprising *Steinernema carpocapsae*; mortality 95%) and the *Heterorhabditis downesi* treatment (mortality 96.5%) provided highest control of pine weevil larvae 4 weeks after treatments. *Steinernema carpocapsae* treatment was slightly better than *Heterorhabditis bacteriophora* treatment (FIG. 11).

All case studies against chafer grubs, leatherjackets, large pine weevil, black vine weevil, western flower *thrips* and sciarid fly demonstrated up to 20-30% more effective than alternative treatments when the Pest control kit was applied.

Referring to FIG. 12, a method 20 of controlling a population of larval or pupal insects is shown according to the second and third aspects, the method comprising the steps of:

a) providing a pest control kit according to FIG. 1 22;
b) mixing the amount of entomopathogenic nematode and the wetting agent composition with a volume of water to generate a volume of activated biopesticide 24;
c) applying the volume of activated biopesticide to an area of earth 26.

It will be appreciated that the above described embodiments are given by way of example only and that various modifications thereto may be made without departing from the scope of the invention as defined in the appended claims.

The invention can also be understood with reference to the following:

TABLE 2

Active ingredients of example pest control kit products according to the first aspect, which in each case includes a wetting agent composition according to the first aspect.

| Target pests | Product | Active ingredient(s) |
| --- | --- | --- |
| Horticulture | | |
| Vine weevil (*Otiorhynchus* spp.) | Pest control kit - H | *Heterorhabditis bacteriophora* |
| Vine weevil (*Otiorhynchus* spp.) | Pest control kit - CT (cold tolerant) | *Heterorhabditis downesi* |
| Vine weevil (*Otiorhynchus* spp.) | Pest control kit - CT Plus | *Heterorhabditis bacteriophora* + *Steinernema feltiae* |
| Leaf miner (*Liriomyza* spp.) Tomato leafminer (*Tuta absoluta*) Western flower thrips (*Frankliniella occidentalis*) | Pest control kit - F | *Steinernema feltiae* |
| Fungus gnat (*Lycoriella* spp.; *Bradysia* spp.) Sciarid fly (*Lycoriella* spp.) | Pest control kit - S | *Steinernema feltiae* |
| Asparagus beetle | Pest control kit - F | *Steinernema feltiae* |
| Turf and amenity | | |
| Welsh chafer (*Hoplia* spp.) Garden chafer (*Phylloperta horticola*) Summer chafer (*Amphimallon solstitiale*) Cockchafer/May beetle (*Melolontha melolontha*) | Pestcontrol kit - C | *Heterorhabditis bacteriophora* *Heterorhabditis bacteriophora* |
| Welsh chafer (*Hoplia* spp.) Garden chafer (*Phylloperta horticola*) Summer chafer (*Amphimallon solstitiale*) Cockchafer/May beetle (*Melolontha melolontha*) | Pest control kit - CT Plus | *Heterorhabditis bacteriophora* + *Steinernema feltiae* |
| Leatherjacket (*Tipula paludosa*) | Pest control kit - L (Spring) Pest control kit - L (Spring) | *Steinernema feltiae* *Steinernema carpocapsae* |
| Mole cricket (*Gryllotalpa gryllotalpa*) | Pest control kit - T | *Steinernema carpocapsae* |
| Forestry | | |
| Large Pine weevil (*Hylobius abietis*) Citrus longhorn beetle (*Anoplophora chinensis*) Spruce bark beetle (*Ips typographus*) | Pest control kit - CT | *Heterorhabditis downesi* |
| Large Pine weevil (*Hylobius abietis*) Citrus longhorn beetle (*Anoplophora chinensis*) Spruce bark beetle (*Ips typographus*) | Pest control kit - T | *Steinernema carpocapsae* |
| Tree pest | | |
| Apple clearwing moth (*Synanthedon myopaeformis*) | Pest control kit - F | *Steinernema feltiae* |
| Banana moth (*Opogona sacchari*) | Pest control kit - T | *Steinernema carpocapsae* |
| Chestnut moth (*Cydia splendana*) | Pest control kit - T | *Steinernema carpocapsae* |
| Citrus root borer (*Diaprepes abbreviates*) | Pest control kit - H | *Heterorhabditis bacteriophora* |
| Cranberry root weevil adults (*Otiorhynchus* spp.) | Pest control kit - H | *Heterorhabditis bacteriophora* |

TABLE 2-continued

Active ingredients of example pest control kit products according to the first aspect, which in each case includes a wetting agent composition according to the first aspect.

| Target pests | Product | Active ingredient(s) |
|---|---|---|
| Codling moth (*Cydia pomonella*) | Pest control kit - F | *Steinernema feltiae* |
| Oriental fruit moth (*Grapholita molesta*) | | |
| Plum fruit moth (*Grapholita funebrana*) | | |
| Cranberry girdler (*Chrysoteuchia topiaria*) | Pest control kit - T | *Steinernema carpocapsae* |
| Cranberry rootworm (*Rhabdopterus picipes*) | Pest control kit - H | *Heterorhabditis bacteriophora* |
| European pepper moth (*Duponchelia fovealis*) | Pest control kit - T | *Steinernema carpocapsae* |
| Flat headed root borer (*Capnodis tenebrionis*) | Pest control kit - T | *Steinernema carpocapsae* |
| Hazelnut borer (*Curculio nucum*) | Pest control kit - H | *Heterorhabditis bacteriophora* |
| Leopard moth (*Zeuzera pyrina*) | Pest control kit - T | *Steinernema carpocapsae* |
| Oak processionary moth (*Thaumetopoea processionea*) | Pest control kit - F | *Steinernema feltiae* |
| Palm moth (*Paysandisia archon*) | Pest control kit - T | *Steinernema carpocapsae* |
| Peach tree borer (*Synanthedon exitiosa*) | Pest control kit - T | *Steinernema carpocapsae* |
| Red palm weevil (*Rhynchophorus ferrugineus*) | Pest control kit - T | *Steinernema carpocapsae* |
| Agriculture | | |
| Western corn rootworm (*Diabrotica virgifera*) | Pest control kit - H | *Heterorhabditis bacteriophora* |
| Leatherjacket (*Tipula oleracea*) | Pest control kit - F | *Steinernema feltiae* |
| Cutworm (*Agrotis* spp.) | Pest control kit - T | *Steinernema carpocapsae* |
| March fly (*Bibionidae*) | Pest control kit - F | *Steinernema feltiae* |
| Woodlouse (*Porcellio scaber*) | Pest control kit - T | *Steinernema carpocapsae* |

Preparation of Tank Mixing
- Take nematode from cold storage at 5-10° C. and keep nematode at room temperature for 30 minutes for acclimatisation.
- Mix Pest control kit formulated pack to 10 L water in a bucket to make homogenous suspension.
- Rinse the pack since nematodes often cling to the packaging. Stir the stock solution until all lumps are dissolved.
- Add three fourths of the required amount of water to the tank along with the required amount of Wetting agent composition at 1 L/100 L of water.
- With the agitator running, add the required amount of Pest control kit through the sieve.
- Add the remaining water and begin application of the nematode maintaining agitation to avoid settlement of the nematodes until all the mixture has been applied.
- Irrigate with 1-2 L of water per square meter after application to wash the nematodes off the grass or soil.
- Use the entire spray solution in a single application once Pest control kit is mixed with water and Wetting agent composition. Do not store for longer than 4 hours in the tank.

Application Precautions
- Do not freeze. The product should be stored at 5 to 10° C. to retain maximum efficacy.
- Remove all filters from nozzles on spraying equipment to avoid blockages.
- Use nozzles with at least 0.8 mm diameter.
- Do not exceed the pump pressure of 5 bars.
- Apply during early morning or late evening during low light levels. Do not apply in bright sunlight as nematodes are vulnerable to UV light and desiccation.
- Moist the soil surface at the time of application and if possible, irrigate before application will be of added advantage.
- Apply nematodes at a time when soil temperature range between 8-30° C. for at least 3-6 hours per day for at least two weeks after application.
- Clean the tank and equipment with clean water before using Pest control kit.

Application of Pest Control Kit Range in Horticultural Crops

TABLE 3

Application rates

| Crop/Substrates | Recommended rate |
|---|---|
| Soil | 0.5 million (infective juvenile nematodes) IJs per square meter |
| Pots, containers, growbags | 10,000 IJs per liter of potting growing media |
| Strawberry | 25,000 IJs per plant |
| Raspberry | 30,000 IJs per plant (10-20 liter pots with growing media) |
| Blueberry | 75,000 IJs per plant |

Irrigation Equipment
- Apply Pest control kit through micro-irrigation (individual spaghetti tube), drip irrigation, or hand-held or motorised calibrated irrigation equipment.
- Irrigate prior to nematode application to moisten soil or growing media surface.
- Dissolve Pest control kit in water and add it to a clean feeder tank.
- Agitate solution continuously during application to prevent nematodes from settling.

Rinse feeder tank with clean water and inject into system after the application.

Plant Dipping Method
Add one pack of 500 million infective nematode in 800 litres of water (enough to treat approx. 4,000 plants with fist-size root balls) and mix the solution thoroughly.
Keep the Pest control kit solution agitated by introducing compressed air.

Drench Application to Containers
Add one pack of 500 million infective nematodes to 1,000 litres of water and evenly apply to the surface of potting media.
Adjust volume accordingly for smaller or bigger pots as outlined in the drench mixing chart.

Dipping of Strawberry Plants
Add one pack of 500 million infective nematodes to 80 litres of water (enough to treat approximately 40,000 plants) containing the Wetting agent composition and mix solution thoroughly.
One Strawberry plant requires approximately 2 mL of nematode solution.

Drench Application
Drench 200 mL around the base of each plant or directly inject at the root zone.
One pack of 500 million infective nematodes diluted in 4,000 litres of water containing Wetting agent composition will treat 20,000 plants.

Statistical Analysis
The number of surviving larvae was transformed into percentage efficacy using the equation below and analysed using analysis of variance (ANOVA). Untransformed data was analysed, because an arcsine-square root transformation did not improve the normality of the percentage data. Differences among treatments were compared using Tukey's mean separation test (P<0.05). Statistical analyses were performed using SPSS statistical software package v22 (IBM, 2013. IBM SPSS Statistics for Windows, Version 22.0. Armonk, NY: IBM Corp.).

$$\% \text{ Efficacy} = \frac{\text{No. of live larvae in control} - \text{No. of live larvae in treatment}}{\text{No. of live larvae in control}} \times 100$$

The invention claimed is:

1. A pest control kit, the pest control kit comprising:
a) a predetermined amount of an entomopathogenic nematode; and
b) a wetting agent composition comprising dipropylene glycol methyl ether.

2. The pest control kit as claimed in claim 1, wherein at least 90% of the entomopathogenic nematodes survive for at least 24 hours after administration of the pest control kit.

3. The pest control kit of claim 1, wherein the wetting agent composition comprises a solvent is at a solvent concentration selected from between 1% to 25% of the unmixed wetting agent composition.

4. The pest control kit of claim 1, wherein the wetting agent composition comprises a polyoxyalkylene glycol.

5. The pest control kit of claim 4, wherein the surfactant is present in a surfactant concentration selected from between 0.5% and 10% v/v of the unmixed wetting agent composition.

6. The pest control kit of claim 1, wherein the wetting agent composition comprises one or more reverse block copolymer surfactants.

7. The pest control kit of claim 1, wherein one or more wetting agents of the wetting agent composition are selected from alkylene oxides.

8. The pest control kit of claim 1, wherein the wetting agent composition comprises one or more wetting compounds selected from polyhydroxyethyl alkoxy alkylene oxides.

9. The pest control kit of claim 1, wherein the wetting agent composition further comprises one or more soil penetrants.

10. The pest control kit of claim 1, wherein the wetting agent composition is provided in liquid or powdered form.

11. The pest control kit of claim 10, wherein the liquid wetting agent composition is arranged to be mixed with water to provide a working wetting agent having a mixed concentration selected from between 1% v/v to 2.86% v/v.

12. The pest control kit of claim 11, wherein the working wetting agent is arranged to be mixed with water at a mixing ratio of working wetting agent:water to provide a final wetting agent composition, wherein the mixing ratio is selected from between 1:35 and 1:90.

13. The pest control kit of claim 1, further comprising a training package, the training package being arranged to train users to use the amount of entomopathogenic nematode and the wetting agent composition to control a population of larval insects.

14. The pest control kit of claim 1, wherein the amount of entomopathogenic nematode comprises between 0.5 million and 5.0 billion entomopathogenic nematodes.

15. The pest control kit of claim 14, wherein the amount of entomopathogenic nematode comprises between 2.5 billion and 5.0 billion entomopathogenic nematodes per hectare of land to be treated.

16. The pest control kit of claim 1, wherein the entomopathogenic nematode is selected from the group: *Heterorhabditis bacteriophora, Heterorhabditis downesi, Steinernema feltiae, Steinernema carpocapsae*, and/or *Steinernema kraussei*.

17. The pest control kit of claim 13, wherein the larval insects are selected from the group: *Tipula* spp., *Tipula oleracea, Gryllotalpa Gryllotalpa, Agrotis* spp., *Otiorhynchus sulcatus, Otiorhynchus* spp., *Hoplia philanthus, Phyllopertha horticola, Amphimallon solstitialis, Melolontha melolontha, Serica brunnea, Cydia pomonella, Cydia molesta, Cydia splendana, Ephydridae, Spodoptera* spp., *Chrysodeixis chalcites, Mamestra brassicae, Duponchelia fovealis, Hylobius abietis, Frankliniella occidentalis, Chromatomyia syngenesiae, Phytomyza vitalbae, Anoplophora chinensis, Ips typographus, Synanthedon myopaeformis, Opogona sacchari, Diaprepes abbreviates, Grapholita molesta, Grapholita funebrana, Chrysoteuchia topiaria, Rhabdopterus picipes, Capnodis tenebrionis, Curculio nucum, Zeuzera pyrina, Thaumetopoea processionea, Paysandisia archon, Synanthedon exitiosa, Rhynchophorus ferrugineus, Diabrotica virgifera, Bibionidae*, and/or *Porcellio scaber*.

18. The pest control kit of claim 16, wherein the entomopathogenic nematodes are active at temperatures above 8° C.

19. The pest control kit of claim 1, wherein the dipropylene glycol methyl ether is present in a solvent concentration selected from between 1% to 25% of the unmixed wetting agent composition.

20. The pest control kit of claim 1, wherein the dipropylene glycol methyl ether is present in a solvent concentration selected from between 5% to 10% of the unmixed wetting agent composition.

21. The pest control kit of claim 1, wherein the wetting agent composition comprises between 0.5% and 10% v/v of the unmixed wetting agent composition of a surfactant.

22. The pest control kit of claim 1, wherein pest mortality is at least 90% for at least 24 hours after administration of the pest control kit.

23. The pest control kit of claim 1, wherein pest mortality is at least 90% for at least 48 hour after administration of the pest control kit.

24. The pest control kit of claim 1, wherein pest mortality is at least 90% for at least 72 hours after administration of the pest control kit.

25. The pest control kit of claim 1, wherein dispersal of the entomopathogenic nematodes is increased compared with control entomopathogenic nematodes in the absence of the wetting agent composition.

26. A composition prepared from the kit of claim 1, wherein the composition is produced by mixing the predetermined amount of an entomopathogenic nematode and the wetting agent composition with a volume of water to generate a volume of activated insecticide.

27. A method of controlling a population of larval insects with the kit of claim 1, comprising:

mixing the predetermined amount of the entomopathogenic nematode and the wetting agent composition with a volume of water to generate a volume of activated insecticide; and applying the volume of activated insecticide to soil containing the population of larval insects.

* * * * *